(12) United States Patent
Cannon

(10) Patent No.: US 9,296,597 B1
(45) Date of Patent: Mar. 29, 2016

(54) HAY LIFT ASSEMBLY

(76) Inventor: David Cannon, Tyler, TX (US)

( * ) Notice: Subject to any disclaimer, the term of this patent is extended or adjusted under 35 U.S.C. 154(b) by 0 days.

(21) Appl. No.: 13/112,543

(22) Filed: May 20, 2011

(51) Int. Cl.
  *B66F 9/18* (2006.01)
(52) U.S. Cl.
  CPC ...................................... *B66F 9/183* (2013.01)
(58) Field of Classification Search
  CPC ................................ B66F 9/183; B66F 9/188
  USPC ............. 414/619, 814, 620–623, 626, 744.8; 294/123, 197, 207, 34, 67.33
  See application file for complete search history.

(56) References Cited

U.S. PATENT DOCUMENTS

| | | | |
|---|---|---|---|
| 2,763,390 A * | 9/1956 | Vandemark | 414/621 |
| 2,874,862 A * | 2/1959 | Farmer et al. | 414/620 |
| 3,073,645 A * | 1/1963 | Behrens | 294/198 |
| 3,194,422 A * | 7/1965 | Shinn, Jr. | 414/621 |
| 3,262,595 A * | 7/1966 | Seip, Jr. et al. | 414/621 |
| 3,677,428 A | 7/1972 | Mallett | |
| 3,802,731 A | 4/1974 | La Bounty | |
| 3,952,881 A | 4/1976 | Knudson | |
| 4,017,114 A * | 4/1977 | LaBounty | 294/197 |
| 4,032,184 A | 6/1977 | Blair | |
| 4,091,943 A * | 5/1978 | Bay-Schmith | 414/812 |
| 4,182,593 A | 1/1980 | Sweet | |
| 4,578,008 A | 3/1986 | Gleason | |
| 4,636,131 A * | 1/1987 | Sinclair | 414/621 |
| 4,697,509 A * | 10/1987 | LaBounty | 100/233 |
| 4,952,111 A | 8/1990 | Callahan | |
| 4,978,274 A * | 12/1990 | de Groot | 414/744.3 |
| 5,127,791 A * | 7/1992 | Attman | 414/814 |
| 5,184,934 A * | 2/1993 | Gallo | 414/740 |
| 5,476,356 A | 12/1995 | Weiss | |
| 5,725,346 A * | 3/1998 | Davina | 414/111 |
| 5,829,940 A | 11/1998 | Mahaney | |
| 6,074,160 A | 6/2000 | Brumbaugh et al. | |
| 6,135,704 A * | 10/2000 | Seaberg | 414/791.6 |
| 8,142,131 B2 * | 3/2012 | Tygard | 414/623 |
| 2001/0038790 A1 | 11/2001 | Evans | |
| 2002/0146311 A1 | 10/2002 | Millsap | |
| 2006/0182600 A1 | 8/2006 | Deyo et al. | |
| 2009/0155040 A1 * | 6/2009 | Martin | 414/744.8 |

FOREIGN PATENT DOCUMENTS

| | | |
|---|---|---|
| GB | 2280419 A | 2/1995 |
| JP | 2000-4647 A | 1/2000 |
| WO | WO 98/58871 A1 | 12/1998 |
| WO | WO 03/055293 A1 | 7/2003 |

* cited by examiner

*Primary Examiner* — Jonathan Snelting
(74) *Attorney, Agent, or Firm* — CARR Law Firm PLLC

(57) ABSTRACT

A hay lift assembly for use to lift and move one or more bales of hay. This may be accomplished by a first gripping member coupled to a second gripping member mounted on a tractor. The second gripping member may be moveable in a first direction relative to the first gripping member. Each gripping member may form a gripping surface that faces the other gripping surface, and each gripping surface may extend in a plane that is perpendicular to the direction of forward travel of a the tractor. The first and second gripping members pivot jointly in a first plane for changing the orientation of a bale of hay gripped between the first and second gripping members and for changing the orientation of the gripping members relative to one or more bales of hay to be gripped.

21 Claims, 19 Drawing Sheets

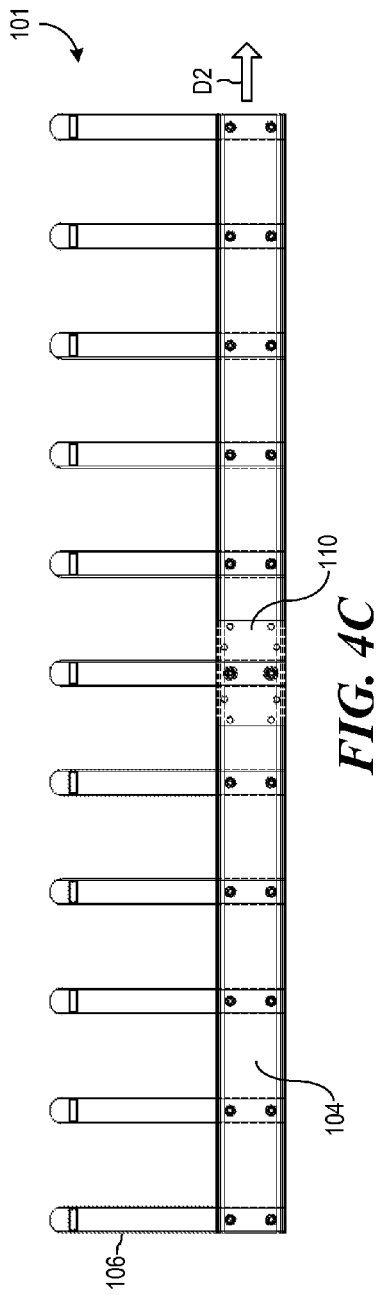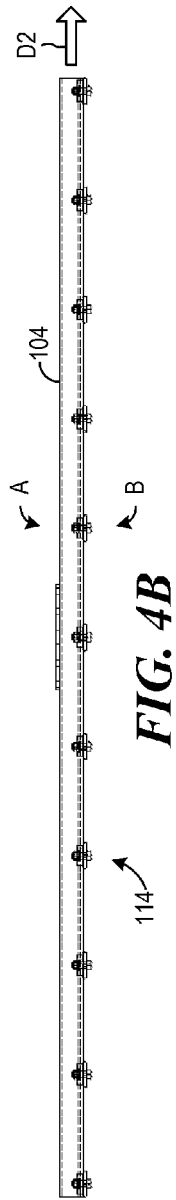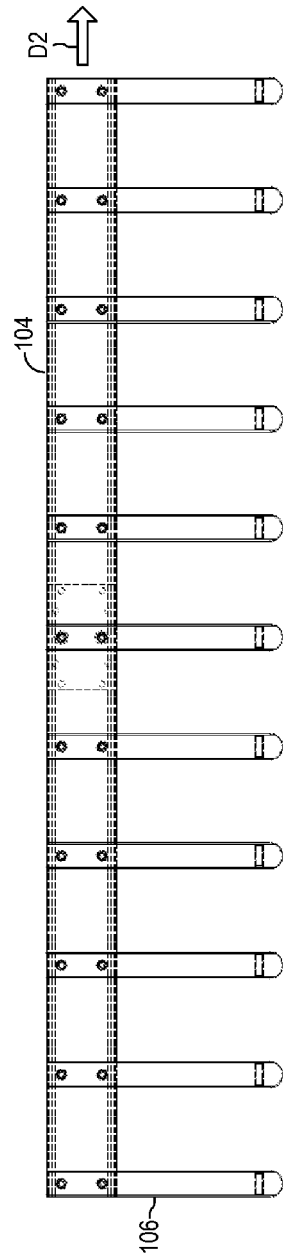

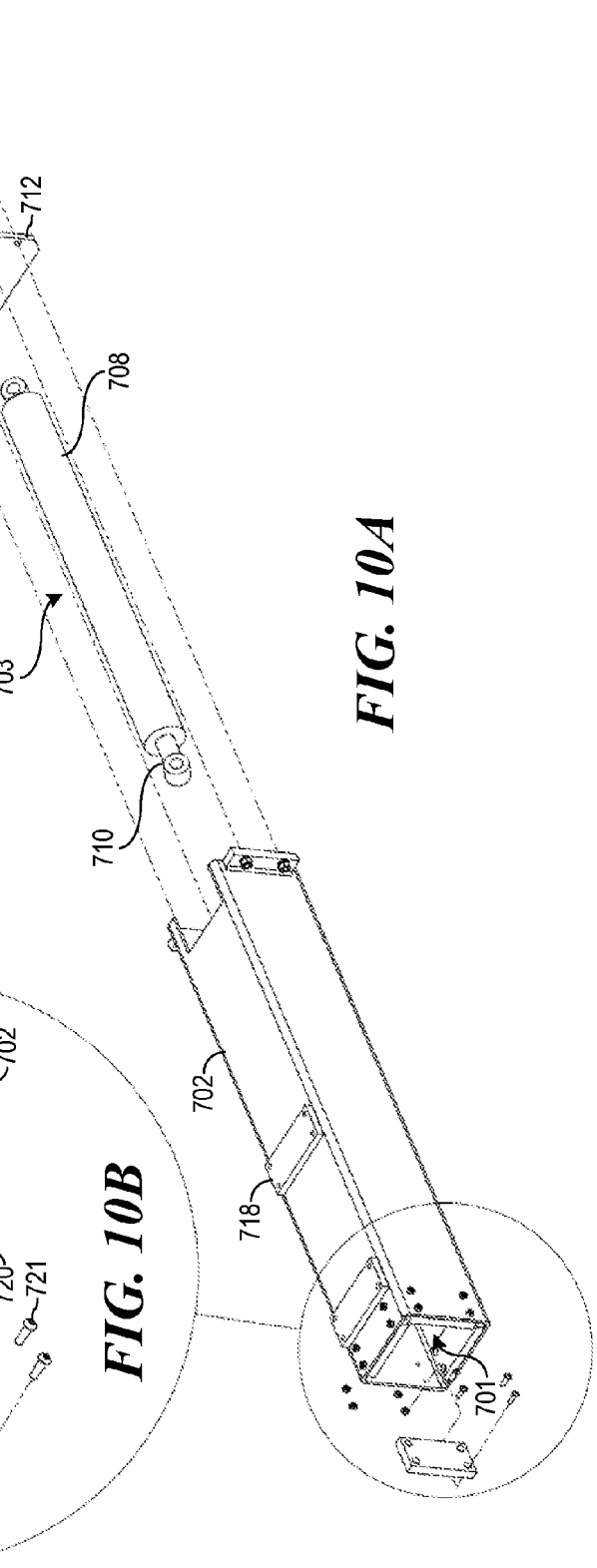
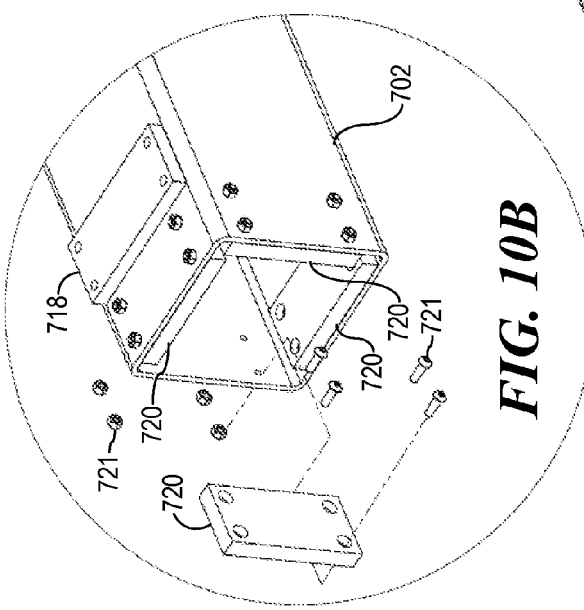
FIG. 10A
FIG. 10B

FIG. 12C  FIG. 12B

HAY LIFT ASSEMBLY

BACKGROUND OF THE INVENTION

1. Field of the Invention

The present invention relates to the design of farm equipment, and, more particularly, the design of equipment for handling bales of hay.

2. Description of the Related Art

Bales of hay may come in two types: round and square, with larger square bales weighing about 1000 kg (2,200 lbs), smaller square bales generally weigh 60 to 110 lbs, and larger round bales weighing 300-400 kg (700-900 lbs). A need exists for a mechanism to lift, transport and place one or more hay bales from and to a variety of positions, for feeding livestock, storage and the like.

SUMMARY OF THE INVENTION

The present invention provides for a hay lift assembly, comprising a first gripping member coupled to a second gripping member. The second gripping member is moveable is a first direction relative to the first gripping member. The first and second gripping members pivot jointly in a first plane for changing the orientation of one or more bales of hay gripped between the first and second gripping members and changing the orientation of the gripping members relative to one or more bales of hay to be gripped.

BRIEF DESCRIPTION OF THE DRAWINGS

For a more complete understanding of the present invention and the advantages thereof, reference is now made to the following Detailed Description taken in conjunction with the accompanying drawings, in which:

FIGS. 4A, 4B, 4C, and 4D are front, top, back and side views of a gripping member;

FIG. 10A is a perspective view of a housing member, and FIG. 10B is a close-up view of portion 10B shown in FIG. 10A;

FIGS. 12A, 12B, 12C are perspective, front, and side views of a support frame assembly, respectively;

DETAILED DESCRIPTION

In the following discussion, numerous specific details are set forth to provide a thorough understanding of the present invention. However, those skilled in the art will appreciate that the present invention may be practiced without such specific details. Additionally, for the most part, specific details and the like have been omitted inasmuch as such details are not considered necessary to obtain a complete understanding of the present invention, and are considered to be within the understanding of persons of ordinary skill in the relevant art. Attached and made a part of this application is Appendix A, which is a set of 34 sheets of engineering drawings of a Hay Lift, Prototype No. 3. This Appendix is incorporated by reference in this application in its entirety to the same extent as if fully set forth herein.

I. Introduction

Figure 1:
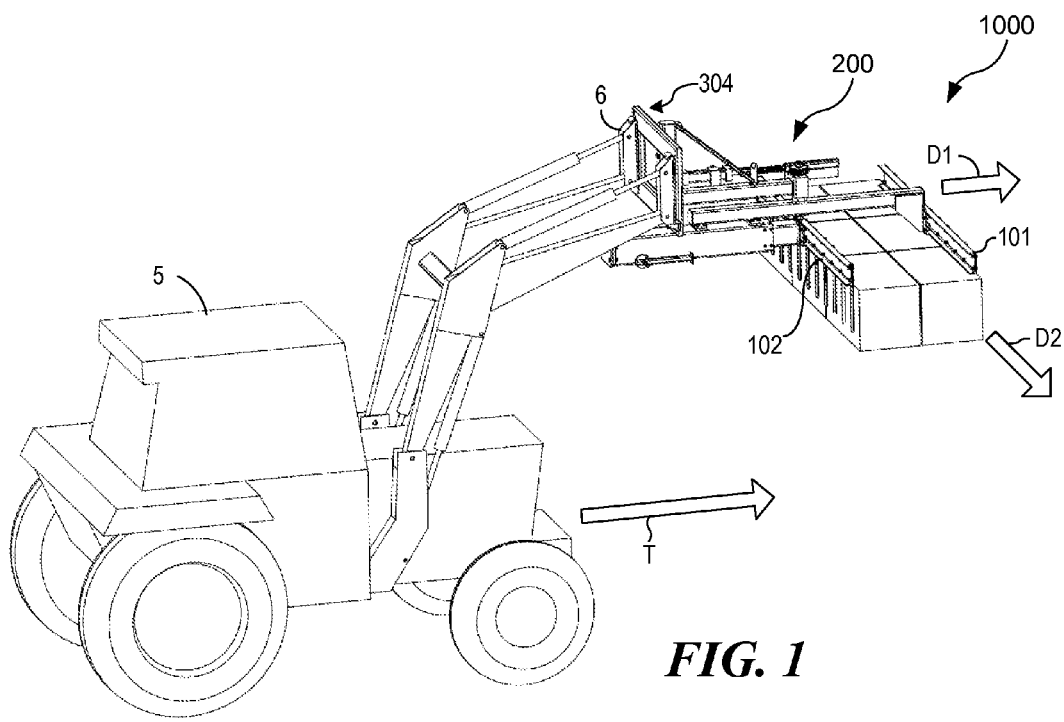
FIG. 1 is a first perspective view of a hay lift assembly attached to a tractor.

As shown in FIG. 1, a hay lift assembly 1000 may comprise a gripper assembly 100 having at least a first gripping member 101 and a second gripping member 102 for gripping and moving one or more bales of hay. The bales of hay intended for use in the hay lift assembly 1000 may comprise square bales weighing 60 to 110 lbs, but it will be apparent that bales of hay of different sizes and shapes may be utilized. The first gripping member 101 and the second gripping member 102 may each have a surface for contacting a bale of hay. The first gripping member 101 and the second gripping member 102 are coupled to an actuator assembly 200 for relative movement. The actuator assembly 200 is adapted to mount to a cage on a front loader arm 6 of a front loader tractor 5. The tractor 5 may transport the hay lift assembly 1000 from one location to another. The front loader tractor 5 may provide an electric and hydraulic power source for moving the first gripping member 101 and the second gripping member 102 relative to one another and relative to the remainder of the hay lift assembly 1000.

Figure 2:
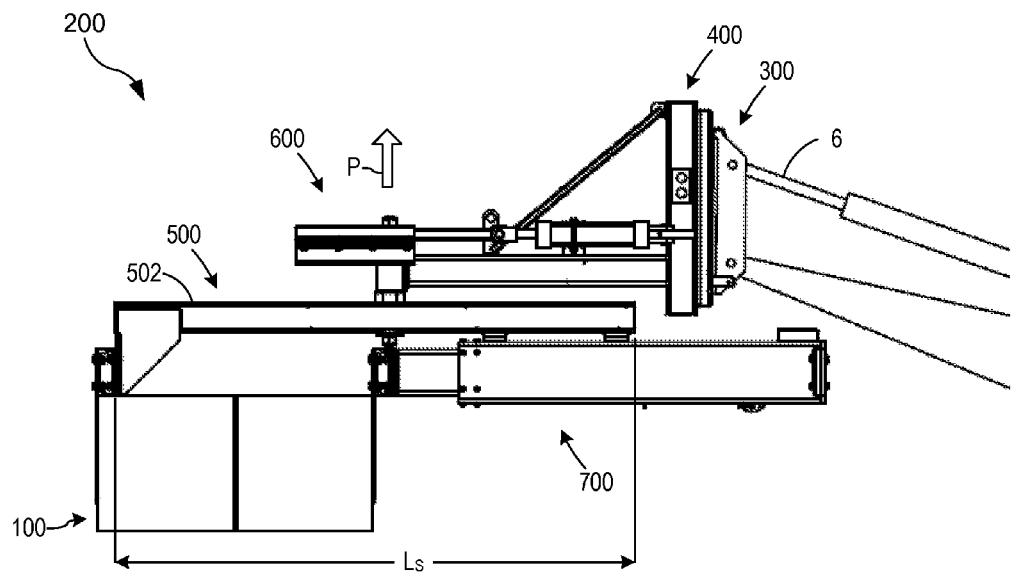
FIG. 2 is a side view of a hay lift assembly attached to a loader arm of a front loader tractor.

Turning now to FIG. 2, the actuator assembly 200 may be mounted to the front loader arm 6 through an adapter assembly 300. The actuator assembly 200 may comprise a support assembly 400, a swing frame assembly 500, a swivel assembly 600, and a tube slide assembly 700. The support frame assembly 400 may couple to the adaptor assembly 200 for supporting the first gripping member 101 and the second gripping member 102. The swing frame assembly 500 may be rotatably mounted to the support frame assembly 400 through the swivel assembly 600. The swivel assembly 600 may be mounted to the support frame assembly 400 to provide a pivot for transferring rotational forces to the swing frame assembly 500. The tube slide assembly 700 may provide movement of one gripping members 101, 102 relative to the other gripping member. The first gripping member 101 and the second gripping member 102 may jointly swivel in a first plane about a pivot axis P with the swing frame assembly 500 on a swing arm 502 relative to the support frame assembly 400 for adjusting the orientation first gripping member 101 and the second gripping member 102.

II. Gripper Assembly 100

Figure 3A:
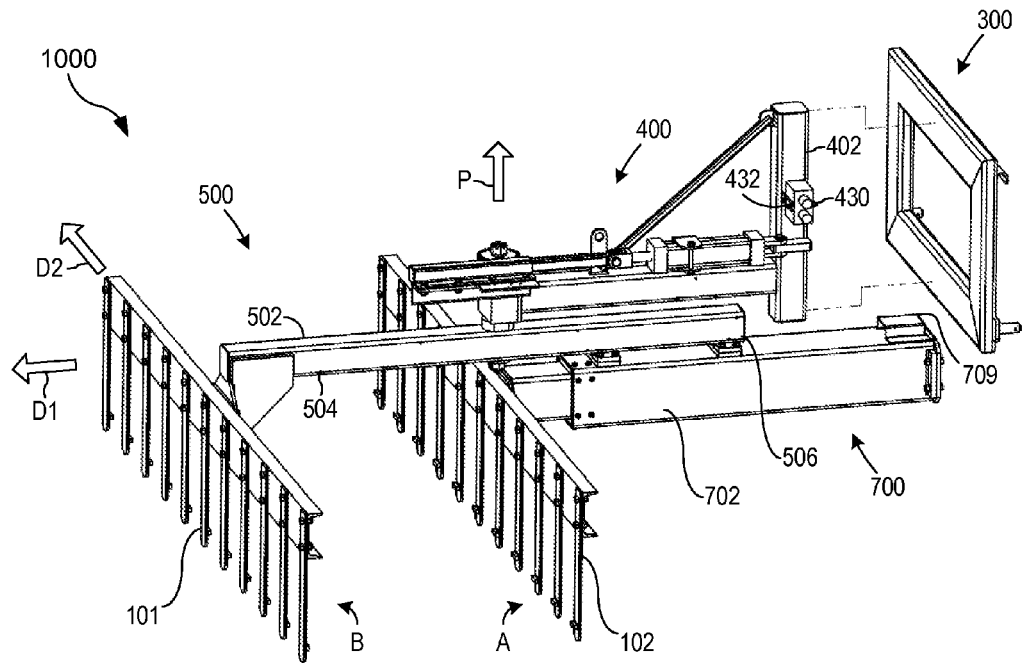
FIGS. 3A and 3B are third and fourth perspective views of a hay lift assembly.
Figure 3B:
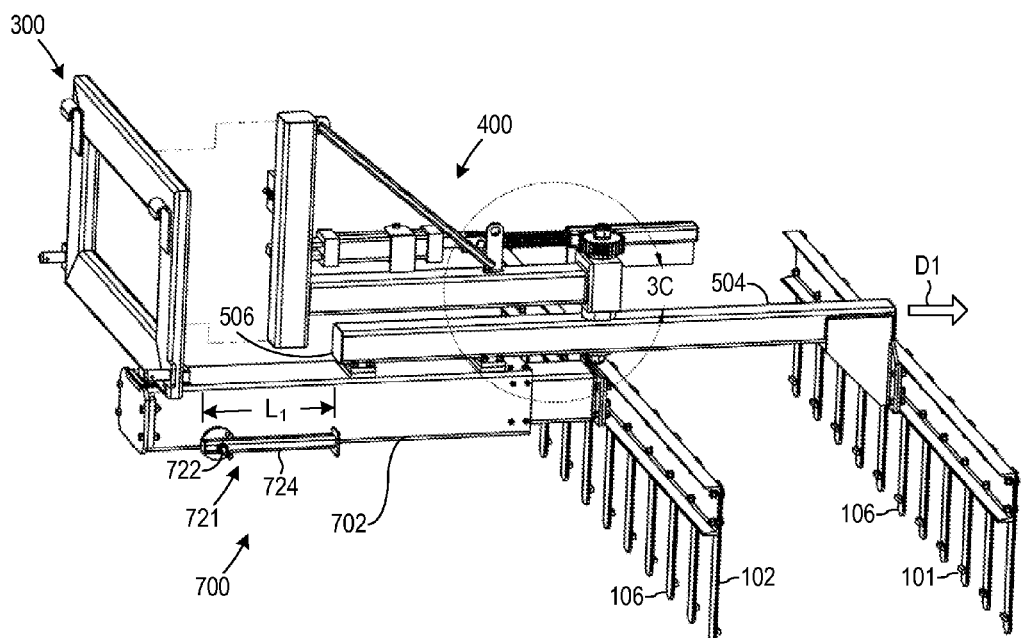

Turning to FIGS. 3A and 3B, the first gripping member 101 and the second gripping member 102 may be coupled to the support frame assembly 400 through the swing frame assembly 500. As shown in FIG. 3A, the swing arm 502 may extend along a direction $d_1$ that extends generally away from the adapter assembly 300, where the hay lift assembly 1000 mounts to the front loader 5 (shown in FIG. 1). In the position shown in FIG. 3A, the swing arm 502 may comprise a first end 504 that is distal from the adapter assembly 300 and a second end 506 that is generally proximal to the adapter assembly 300.

In some embodiments, the first gripping member 101 may be fixedly coupled to the swing arm 502 generally on the first end 504 so that any movement of the swing arm 502 translates directly into movement of the first gripping member 101.

Figure 8:
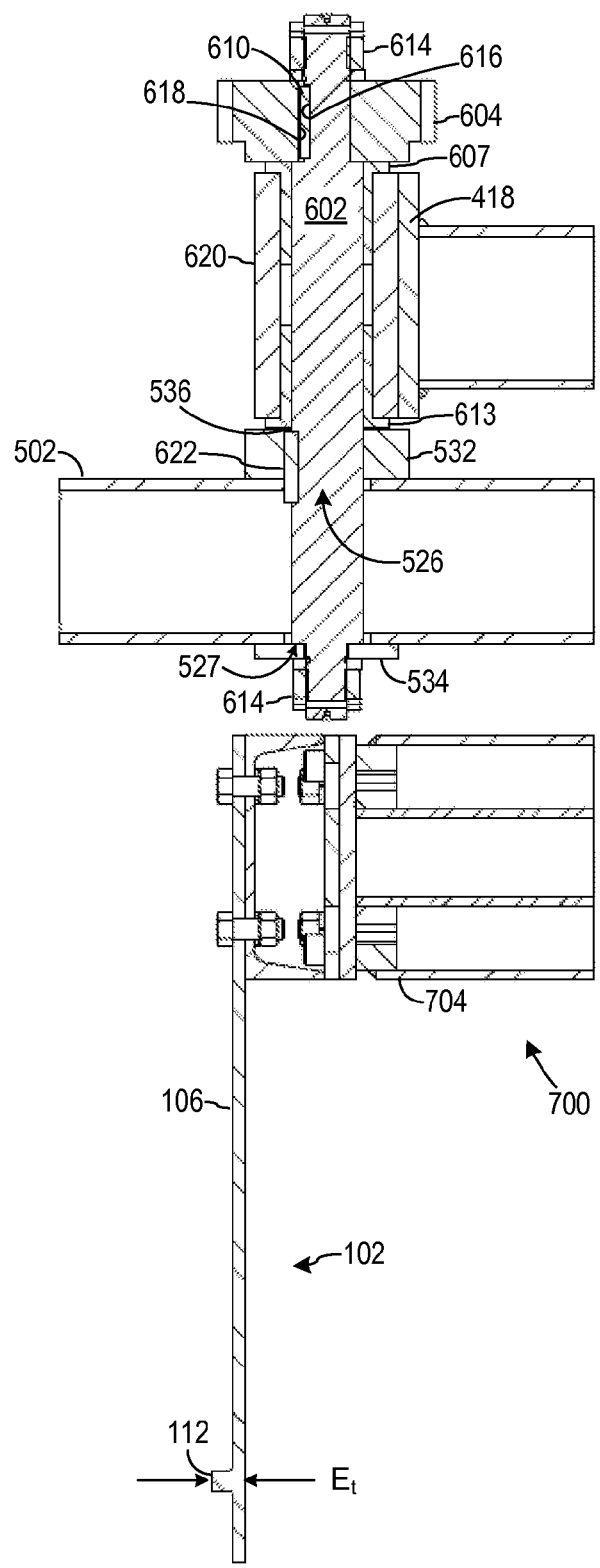
FIG. 8 is a cross-sectional view of the swivel assembly coupled to the swing arm taken along line 8-8 shown in FIG. 17A.

The second gripping member 102 may be coupled through the tube slide assembly 700 to the swing arm 502 generally on the second end 506. The tube slide assembly 700 may provide for movement of the second gripping member 102 relative to the first gripping member 101 and relative to the swing arm 502. In the embodiment shown, the second gripping member 102 is configured to linearly translate along the direction $d_1$ along the length of the swing arm 502. As shown in FIG. 8, the second gripping member 102 may be fixedly coupled to a slider member 704 on the tube slide assembly 700 and may be configured to slide relative to a housing member 702. Thus, the second gripping member 102 may slide along the direction $d_1$ relative to the first gripping member 101, and rotate about pivot axis P along with the first gripping member 101, both rotating relative to the support frame assembly 400.

The first gripping member 101 and the second gripping member 102 may be nearly identical in their features. For purposes of this description, the second gripping member 102 will be considered to have the same features as those described for the first gripping member 101, unless otherwise noted.

Turning now to FIGS. 4A, 4B, 4C, and 4D, the first gripping member 101 may comprise a bar member 104 having a length extending in generally a second direction $d_2$, also shown in FIG. 3A. The bar member 104 may comprise a straight beam portion extending generally in the second direction $d_2$, which may be perpendicular to the first direction $d_1$ of the swing arm 502. In at least one position of the hay lift assembly 1000, the beam portion of the bar member 104 extends in the direction $d_2$ that is perpendicular to the direction of travel t of the tractor 5, as shown in FIG. 1. In other positions illustrated below for the hay lift assembly 1000, the beam portion may rotate to extend in the direction d2 at a non-perpendicular angle to the direction of travel t.

Along the length of the bar member 104 a plurality of finger members 106 may be positioned to extend in a direction orthogonal to the direction d2 of the bar member 104. Each finger member 106 may comprise a beam member coupled on a first side of the bar member 104 to a portion of the length of the bar member 104, as shown in FIGS. 4A and 4C, each finger member 106 may be equally spaced from an adjacent finger member 106, and each finger member 106 may comprise a uniform length and a uniform width.

Figure 4D:
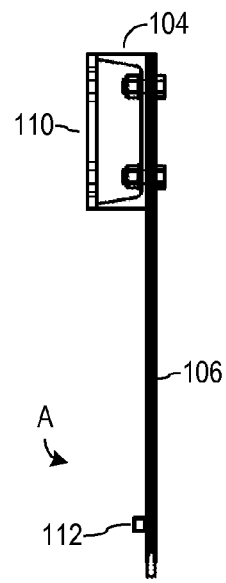

In some embodiments, as shown in FIG. 4D, a profile of the beam portion of the bar member 104 forms a general "C" shape providing a generally flat side and a generally convex side. The flat portion may provide a beam surface 108 for mounting the finger members 106 to the bar member 104 in a uniform manner.

As shown in FIGS. 4C and 4D, a connection plate 110 may be coupled on the beam surface to cover a portion of the recess of the beam. The connection plate 110 may be mounted to a portion of the bar member 104 substantially in the center of the length of the bar member 104, as shown in FIG. 4C. The connection plate 110 may comprise connection apertures for receiving fastener members such as bolts 111. The apertures and bolts may provide a means for attaching the first gripping member 101 to the swing arm 502.

As shown in FIGS. 4A and 4C, the bar member 104 and finger members 106 form a comb configuration generally comprising a gripping surface made up of the external surfaces of one side of the first gripping member 101, shown in FIGS. 4B and 4D as side "A". The gripping surface extends generally in a plane that extends parallel to the bar member 104 in the direction $d_2$. In at least a first position, each a gripping surface of the first gripping member 101 and a gripping surface of the second gripping member 102 faces each other, and each gripping surface generally extends in a plane that is substantially perpendicular to the direction of forward travel t of the tractor 5, which in some embodiments comprises 90 degrees plus or minus 10 degrees from the direction of forward travel t, as shown in FIG. 1.

Either side of the first gripping member 101 or the second gripping member 102 may be used as a gripping surface, depending on how each gripping member 101, 102 is coupled to the swing arm 502. By example, as shown in FIGS. 3A and 4C, the gripping surface of the first gripping member 101 is shown as side A—the side having the connection plate 110, and the gripping surface corresponding to the second gripping member is shown as side B, as shown in FIG. 3A. In the configuration shown in FIGS. 3A and 3B, the concave side of the bar member 104 of the first gripping member 101 faces the flat side of the bar member of the second gripping member so that side A of the first gripping member 101 faces side B of the second gripping member 102.

One or more of the finger members 106 may each comprise an extension member 112, shown in FIGS. 4D and 8, which may extend from a surface of the beam portion of each finger member 106 on an end of the finger member 106 opposite from the end where the finger member 106 couples to the bar member 104. Each extension member 112 may form a part of the gripping surface (side A or side B) of the first gripping member 101 or the second gripping member 102. As shown in FIG. 4D, the extension members 112 may each be configured with a length, a width, and a thickness to decrease slippage and increase the grip on a target bale of hay when the first gripping member 101 or the second gripping member 102 makes contact with the target bale of hay. In some embodiments, the combined thickness $E_t$ of the finger member 106 and extension member 112, as shown in FIG. 8, may be no more than about ⅝ inches. Such a thickness may provide for closer side-by-side placement and stacking of bales of hay, because the target bale of hay may be placed close to an adjacent bale of hay, but still take advantage of the gripping capability of the extension members 112.

As shown in FIG. 4B, a fork 114 comprised of one or more extension members 112 may be configured to penetrate into the bale of hay to enhance the hold of the gripping assembly 100. Each extension member 112 may form a prong of the fork 114. The fork 114 may rotate with the swing arm 502 as part of the gripping assembly 100.

III. Swing Frame Assembly 500 and Swivel Assembly 600

Figure 5A:
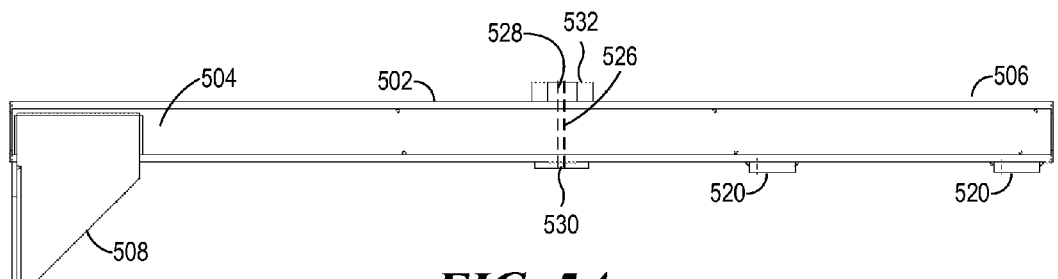
FIGS. 5A, 5B, and 5C are front, top, and side views, respectively, of a swing arm.
Figure 5B:
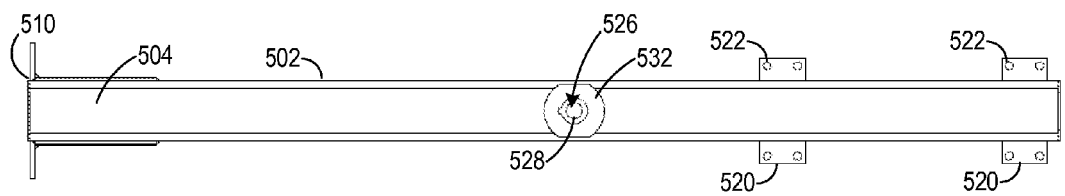
Figure 5C:
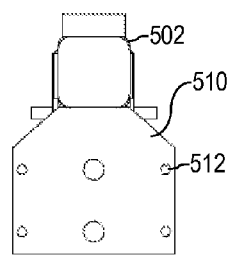

As shown in FIG. 2, the swing frame assembly 500 may be rotatably coupled to the support frame assembly 400 for jointly swiveling the first gripping member 101 and the second gripping member 102 relative to the support frame assembly 400 substantially about the pivot axis P. Turning now to FIGS. 5A, 5B, and 5C, the swing arm 502 of the swing frame assembly 500 may be coupled on the first end 504 to the first gripping member 101. As shown in FIG. 3A, the second end 506 of the swing arm 502 may be coupled to the tube slide assembly 700, which in turn is coupled to the second gripping member 102. Rotation of the swing arm 502 about the pivot axis P may cause joint swiveling of the first gripping member 101 and the second gripping member 102.

Figure 6:
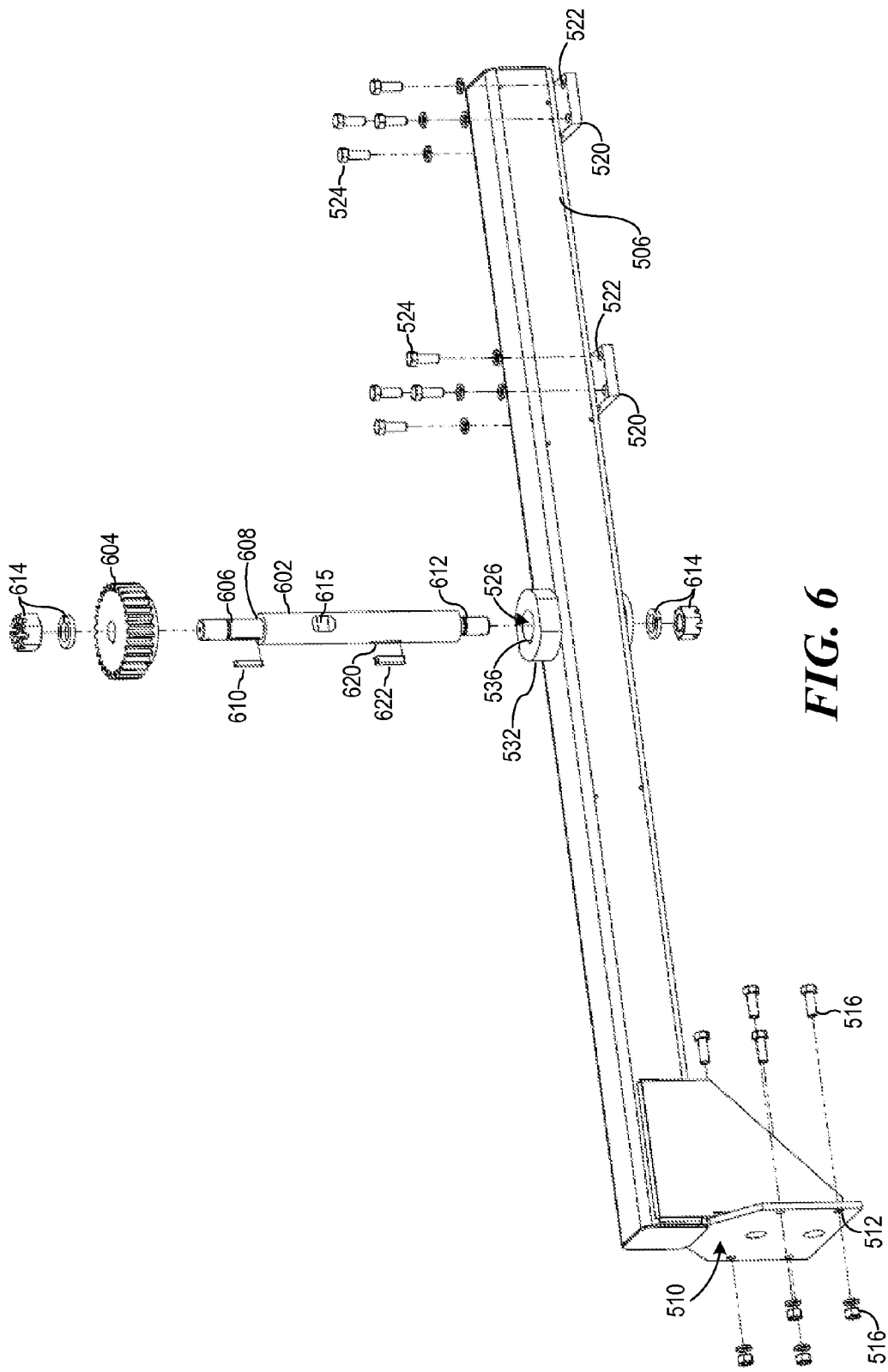
FIG. 6 is a perspective view of a swing frame assembly and portions of a swivel assembly exploded into its component parts.

The swing arm 502 may couple at the first end 504 to the first gripping member 101, as shown in FIG. 3A. Turning to FIGS. 5A and B, a swing arm bracket 508 may couple to the swing arm 502 to extend from the first end 504. Referring to FIGS. 5A, 5C and 6, the swing arm bracket 508 may provide a bracket surface 510 having bracket apertures 512 for receiving fasteners, such as bracket nuts and bolts 516. Turning to FIG. 6, the first gripping member 101 and the swing arm 502 may be secured by the bracket bolts 516 that may extend through the bracket surface 510 and through the connection apertures (shown in FIG. 4C) of the connection plate 110 to threadably engage with bracket nuts and washers 514.

Referring to FIGS. 5B and 6, the swing arm 502 may further comprise one or more attachment plates 520 positioned generally along the length of the swing arm 502 and generally at the second end 506 for providing surfaces for attaching the swing arm 502 to the tube slide assembly 700 (shown in FIG. 2). Attachment apertures 522 may extend through each attachment plate 520 for receiving fasteners such as attachment bolts 524.

Turning to FIG. 5B and FIG. 6, the swing arm 502 may further comprise a pivot aperture 526 extending through the swing arm 502 to form a first opening 528 and a second opening 530 (shown in FIG. 5A) in the outer surface of the swing arm 502. A first boss 532 may surround the first opening 528 and a second boss 534 may surround the second opening 530.

Figure 7:
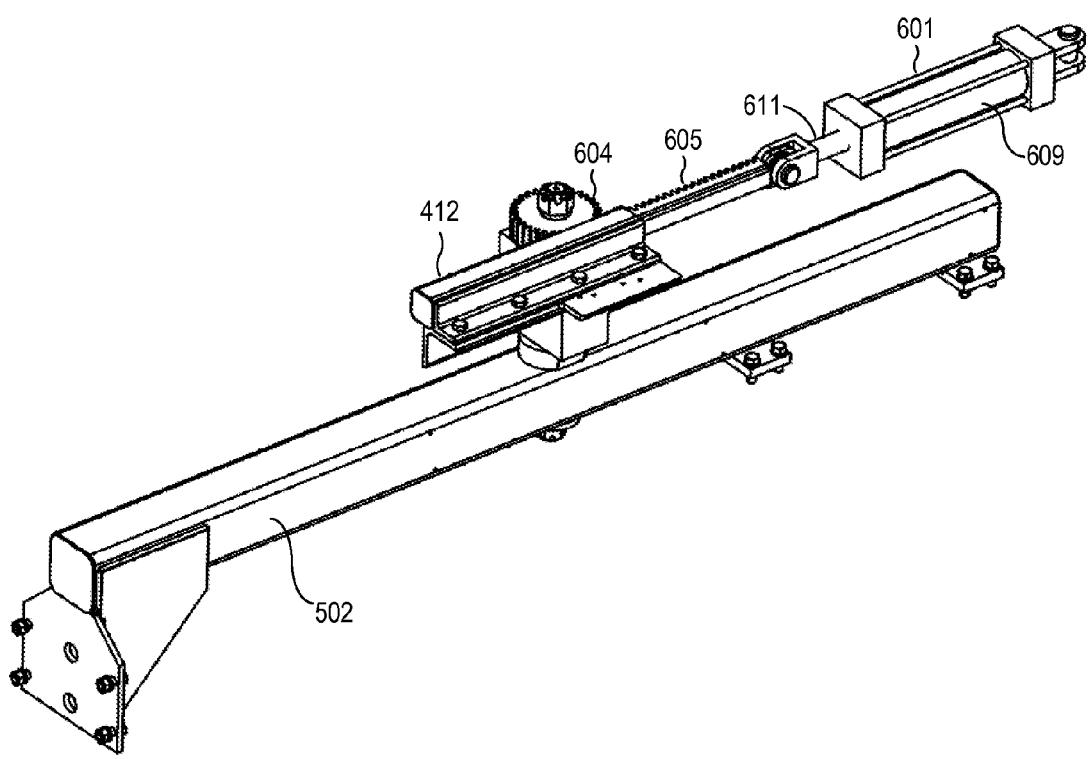
FIG. 7 is a perspective view of a swing arm assembly and a swivel assembly with the support frame assembly and tube slide assembly removed.

Turning to FIG. 7, the swivel assembly 600 may comprise a first motor 601 operationally coupled to a pivot shaft 602 (shown in FIG. 6) and a first gear member 604 and a second gear member 605. In some embodiments, the first gear member 604 and the second gear member 605 comprise a gear wheel having gear teeth operationally meshed with gear teeth of a rack gear, respectively, and the first motor 601 comprises a hydraulic motor, having a cylinder portion 609 and a piston portion 611. The first motor 601 may drive the second gear member 605 transferring the linear motion of the rack gear into rotational motion of the gear wheel of the first gear member 604. As shown in FIG. 8, the pivot shaft 602 may be rotationally coupled to the first gear member 604 to rotate with the gear wheel for transferring rotational forces to the swing arm 502.

As shown in FIG. 6, a hub portion of the first gear member 604 may slide onto a neck portion 606 of the pivot shaft 602 and may abut a first ridge surface 608 of the pivot shaft 602. As shown in FIG. 8A, a first portion of a first key member 610 may fill a first slot 616 in the outer surface of the neck portion 606 and a second portion of the first key member 610 may fill a second slot 618 in the inner surface of the hub portion of the first gear member 604 to transfer rotational forces between the first gear member 604 and the pivot shaft 602.

Turning to FIG. 8, the pivot shaft 602 and the first gear member 604 may couple to the swing arm 502 for transferring the rotation of the first gear member 604 provided by movement of the first motor 601 and the second gear member 605 to the pivot shaft 602 and to swing arm 502. The first boss 532, the pivot aperture 526, and the second boss 534 may form one continuous channel for receiving the pivot shaft 602. As shown in FIG. 6, a second end of the pivot shaft 602 may comprise a base portion 612. The base portion 612 may be received by the pivot aperture 526 at the first opening 528 and extend within the pivot aperture 526 to an inner ridge surface 527, shown in FIG. 8, on the inner surfaces of the pivot aperture 526. When the pivot shaft 602 is installed in the swing arm 502, the base portion 612 may extend outside the swing arm 502 and beyond the second boss 534.

Referring to FIGS. 6 and 8A, the pivot shaft 602 may be further secured to the swing arm 502 by shaft fasteners 614 comprising, in some embodiments, a slotted hex nut and washer. Each slotted hex nut of the shaft fasteners 614 threadably engages, over the washer, a threaded sleeve on the base portion 612 and threadably engages a threaded sleeve, over the washer, on the neck portion 606.

Referring to FIGS. 6 and 8A, a first portion of a second key member 622 may fill a third slot 536 within the aperture of the first hub portion 532 and a second portion of the second key member 622 may fill a fourth slot 620 extending on the pivot shaft 602 to transfer rotational forces from the pivot shaft 602 to the swing arm 502. One or more wrench flats 615 may be located on an outside surface of the pivot shaft 602 for gripping the pivot shaft 602 and assisting in installation and connection of the components of the swing frame assembly 500 and swivel assembly 600.

IV. Tube Slide Assembly 700

As shown in FIG. 2, the tube slide assembly 700 may be coupled generally to the second end 506 of the swing arm 502 for rotational movement of the tube slide assembly 700 with rotation of the swing arm 502. Referring now to FIGS. 8A and 8B, the housing member 702 may be slideably coupled through a second motor 703 to the slider member 704, which is configured for movement relative to the housing member 702.

Figure 9A:
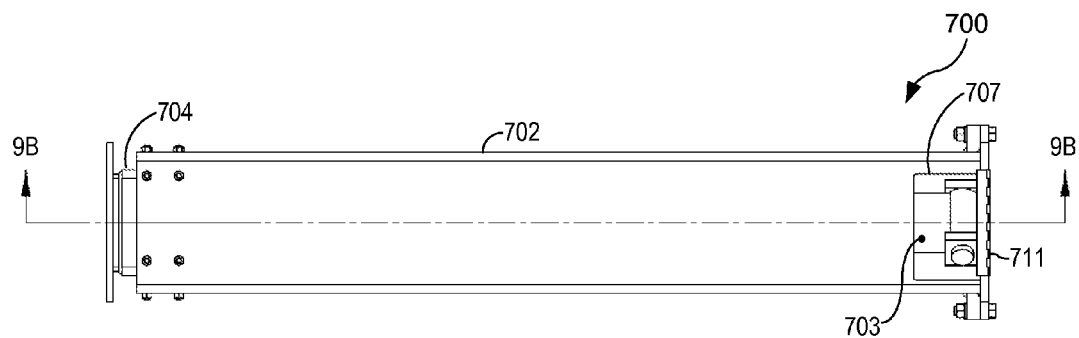
FIGS. 9A and 9B are a cross-section view of a tube slide assembly taken along line 9A-9A shown in FIG. 9B and a top view of the tube slide assembly, respectively.

Turning now to FIGS. 9A and 10A, the housing member 702 may comprise a hollow tube forming a first receptacle 701 that is closed on a first end by a housing cap 712 (shown removed in FIG. 9) and open on a second end. The housing member 702 may enclose at least a portion of the second motor 703. The first receptacle 701 may be configured to receive at least a portion of the slider member 704 for slideable movement of the slider member 704 along the inner walls of the first receptacle 701. The slider member 704 may be configured to fit substantially snug within the housing member 702 for movement of at least portions of the slider member 704 in an out of the housing member 702.

Figure 11:
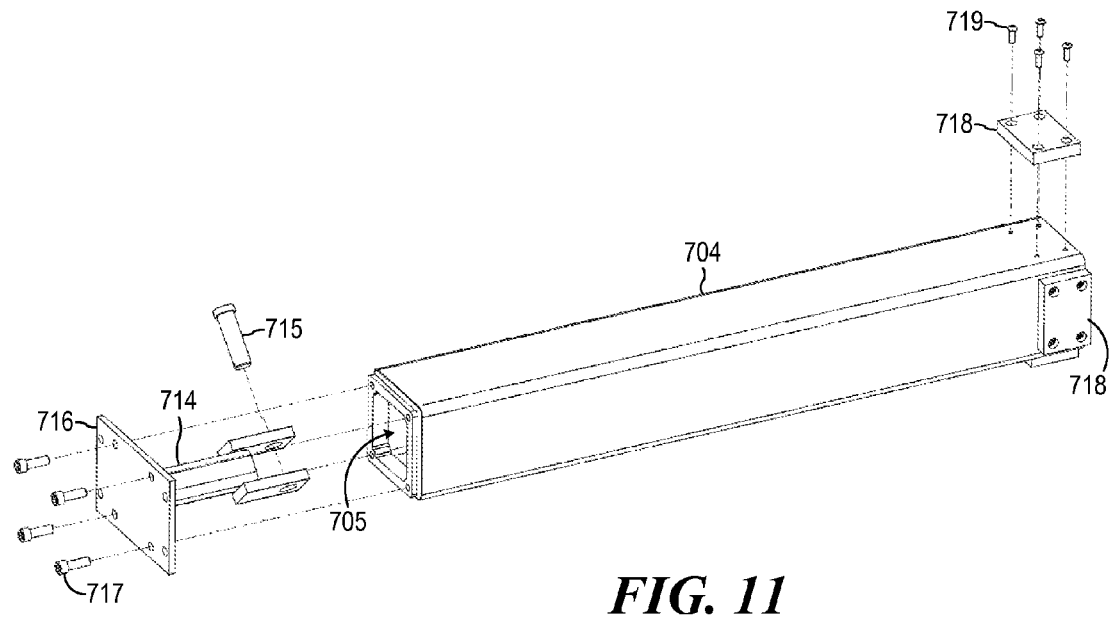
FIG. 11 is a perspective view of a slider member.

Turning now to FIGS. 11 and 9A, the slider member 704 may comprise a hollow tube forming a second receptacle 705 that is closed on a first end by a slider member cap 716 and open on a second end. The second receptacle 705 may be configured to receive at least a portion of the second motor 703 for movement of at least a portion of the second motor 703 within the second receptacle 703.

Figure 9B:
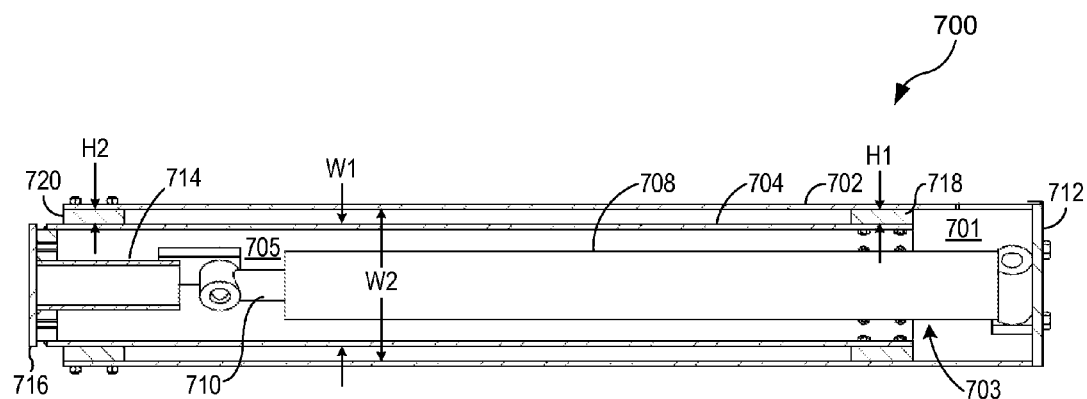

In some embodiments, as shown in FIGS. 9A, 9B, and 10A, the second motor 703 comprises a hydraulic motor, having a cylinder portion 708 and a piston portion 710. The cylinder portion 708 may be coupled to an inner wall of the first receptacle 701. The cylinder portion 708 may be connected to a hydraulic power source through housing opening 707. The access port 707 may be covered by a cover 709, as shown in FIGS. 3A and 10A, which may be mounted through hinge 711 to the housing member 702. Referring to FIG. 9B, the piston portion 710 may be coupled to an inner wall of the second receptacle 705. Actuation of the piston portion 710 within the cylinder portion 708 may cause movement of the slider member 704 relative to the housing member 702.

Turning now to FIGS. 9A and 10A, the cylinder portion 708 may couple to the inner wall of the first receptacle 701 at a tail mount 706 that may extend from 712 housing cap 712 that substantially closes the first end of the housing member 702. The housing cap 712 may comprise a plate that is attached with bolts 713 to the first end of the housing member 702. The tail mount 706 may comprise coupling feature comprising an aperture that that may correspond with an aperture in the cylinder portion 708 for receiving a pin, such as a clevis pin, for mounting the cylinder portion 708 to the housing member 702.

Turning now to FIGS. 9A and 11, the piston portion 710 may couple to the inner wall of the second receptacle 705 at a rod end portion 714 that may extend from the slider member cap 716 that substantially closes the first end of the slider member 704. The slider member cap 716 may comprise a plate that is attached with bolts 717 to the first end of the slider member 704. The rod end portion 714 may comprise a coupling feature comprising an aperture that that may correspond with an aperture in the piston portion 710 for receiving a pin, such as a clevis pin 715, for mounting the cylinder to the housing member 702.

Turning now to FIGS. 9A and 10B, the housing member 702 and the slider member 704 may comprise at least one surface for slideable movement of the slider member 704 relative to the housing member 702, when the slider member 704 is moved by the second motor 703. The housing member 702 may comprise housing member pads 720 positioned generally at a second end of the housing member 702 opposite from the first end. The housing member pads 720 may be mounted with nuts and bolts 721 on an inner surface of first receptacle 701 of the housing member 702.

In the embodiment shown in FIGS. 9A and 11, the slider member 704 comprises slider member pads 718 positioned generally at a second end of the slider member 704 opposite from the first end. The slider member pads 718 may be mounted with bolts 719 or screws on the outer surface of the slider member 704.

Referring to FIG. 9A, an outer width $w_1$ of the slider member 704 may be configured to be less than a width $w_2$ of the first receptacle 701 of the housing member 702. A height $h_1$ of the slider member pads 718 may be configured so that the slider member pads 706 extend from the outer surface of the slider member 704 to make up the difference in widths $w_1$, $w_2$ of the slider member 704 and the first receptacle 701.

A height $h_2$ of the housing member pads 720 may be configured so that the housing member pads 720 extend from the outer surface of the housing member 702 to make up the difference in widths $w_1$, $w_2$ of the slider member 704 and the first receptacle 701. Each of slider member pads 718 and the housing member pads 720 may be coupled to the slider member 704 and the housing member 702 with fasteners, such bolts 719 that extend through apertures in each structure and that are secured with nuts. Heads of the bolts 719 may fit within recesses in the surface of each of the slider member pads 718 and the housing member pads 720 to prevent the heads from rubbing against a surface when the slider member 704 is moving within the housing member 702, and to allow for some wear on the pads before replacement is necessary.

The slider member pads 718 and the housing member pads 720 may further provide a snug fit for the slider member 704 to keep the slider member 720 on substantially a straight path and reduce structural stress on other portions of the hay lift assembly 1000. The housing member pads 720 may further provide a stop at the second end of the housing member 702 to prevent the slider member 704 from disengaging from the housing member 702.

Each of slider member pads 718 and the housing member pads 720 may be made from plastic material for reducing friction when the slider member 704 slides within the first receptacle 701. It will be apparent to persons of ordinary skill in the art that other material suitable for accomplishing the benefits and apparent advantages of the pads 718 and 720 may be used here including rubber, fiberglass, ceramics, metals and other composite materials.

V. Support Frame Assembly 400

As shown in FIG. 1, the support frame assembly 400 provides structural support for the gripping assembly 100, the swing frame assembly 500, and the tube slide assembly 700. Further the adapter assembly 300 may mount to the support frame assembly to provide an interface between a moving machine, such as a tractor 5 having a front loader arm 6, and the first gripping member 101 and the second gripping member 102, allowing the gripping members to be positioned near one or more bales of hay for gripping, lifting, reorienting, and moving the bales.

Figure 12A:
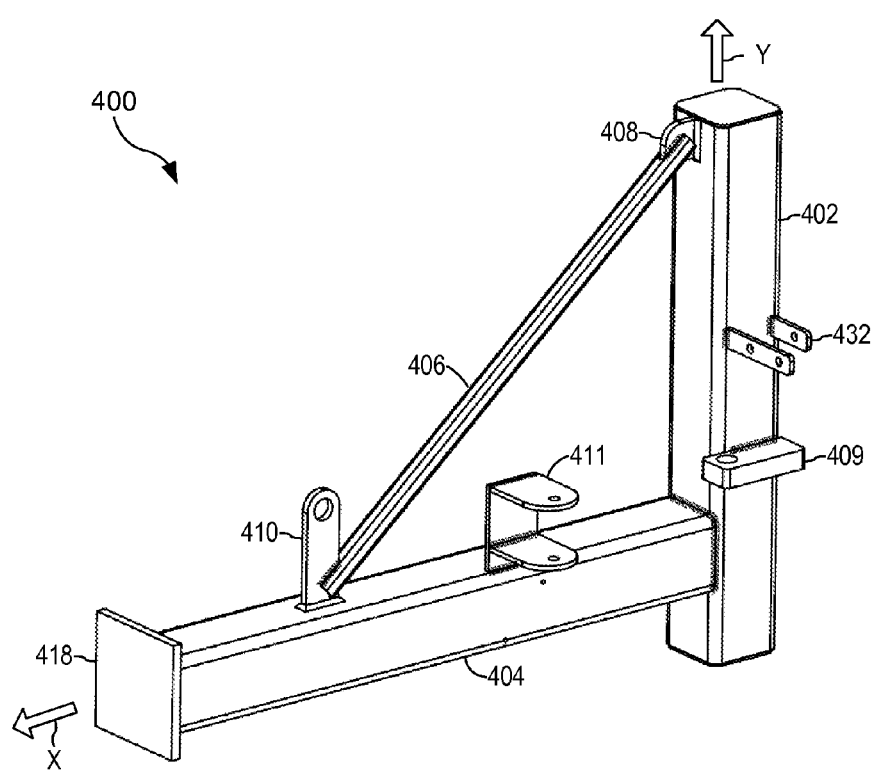

Turning now to FIGS. 12A, 12B, and 12C, the support frame assembly 400 may comprise a first support member 402 extending in a first direction y and a second support member 404 extending generally in a second direction x, which is orthogonal to the first direction y. The first direction y and the second direction x may comprise a part of a right-handed coordinate system having a third direction z, shown in FIG. 12C, that will be used in this description for providing the relative orientation of different components.

A first end of the second support member 404 may be coupled generally near a first end of the first support member 402 so that the coupled members generally form an "L" shape. The second support member 404 may be disposed at a height $h_3$ from the first end of the first support member 402.

In some embodiments, a tension member 406 may couple between a first tension member lug 408 on a second end of the first support member 402 and a second tension member lug 410 on a point along the length of the second support member 404. The tension member 406 may function as a brace or support for maintaining structural rigidity of the support frame assembly 400.

The second tension member lug 410 may comprise a lifting feature, which is shown in FIG. 12B as a lifting eye 413, comprising a bore extending through the second tension member lug 410. The lifting eye 413 may be positioned along a vertical line w extending from the center of gravity $c_1$ of the hay lift assembly 1000. The lifting eye 413 may provide for balanced lifting of the hay lift assembly 1000, when the hay lift assembly 1000 is not coupled to a tractor 5.

Figure 13:
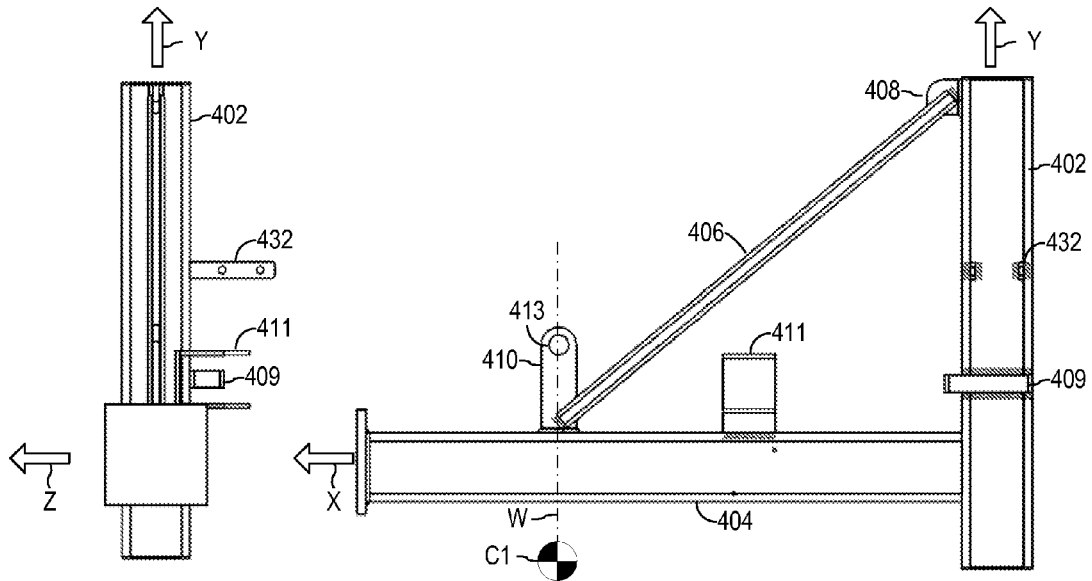
FIG. 13 is a perspective view of portions of a swivel assembly coupled with a support frame assembly.
Figure 13:
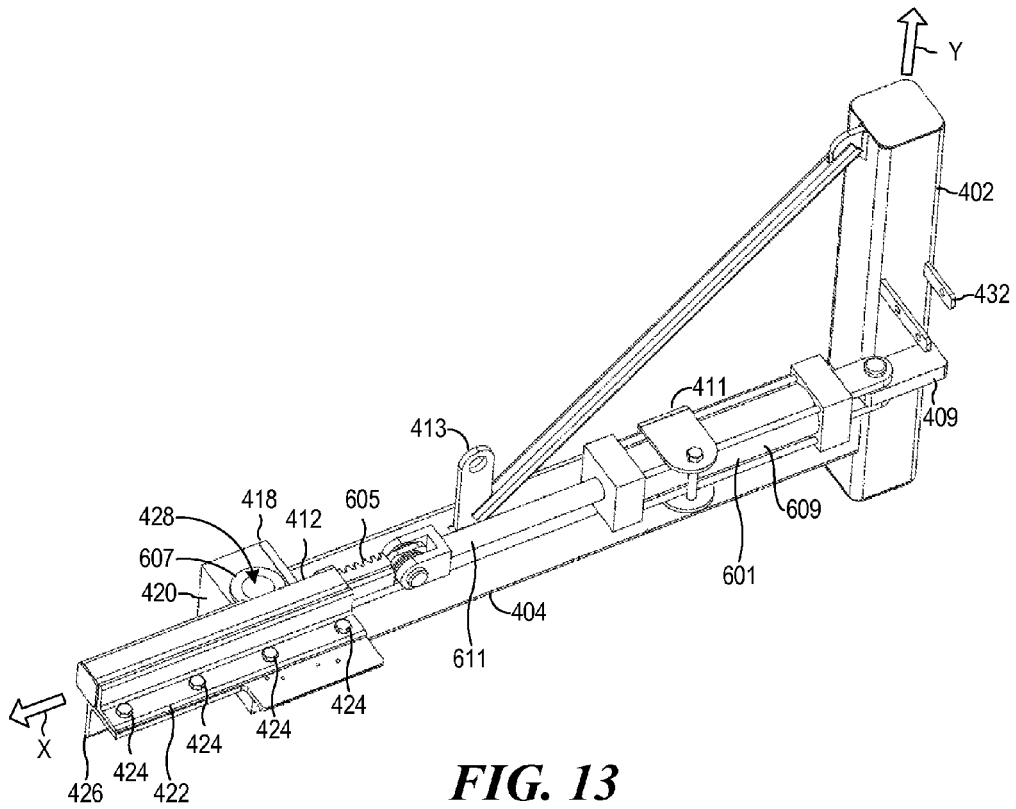

Turning to FIG. 13, the swivel assembly 600 may be mounted on the support frame assembly 400 for providing an actuation force to swivel the first gripping member 101 and the second gripping member 102. In the embodiment shown, a first motor lug 409 may extend from a side surface of the first support member 402. A first motor bracket 411 may extend from a top surface of the second support member 404. The cylinder portion 609 of the first motor 601 may couple between the first motor lug 409 and the first motor bracket 411.

Figure 14A:
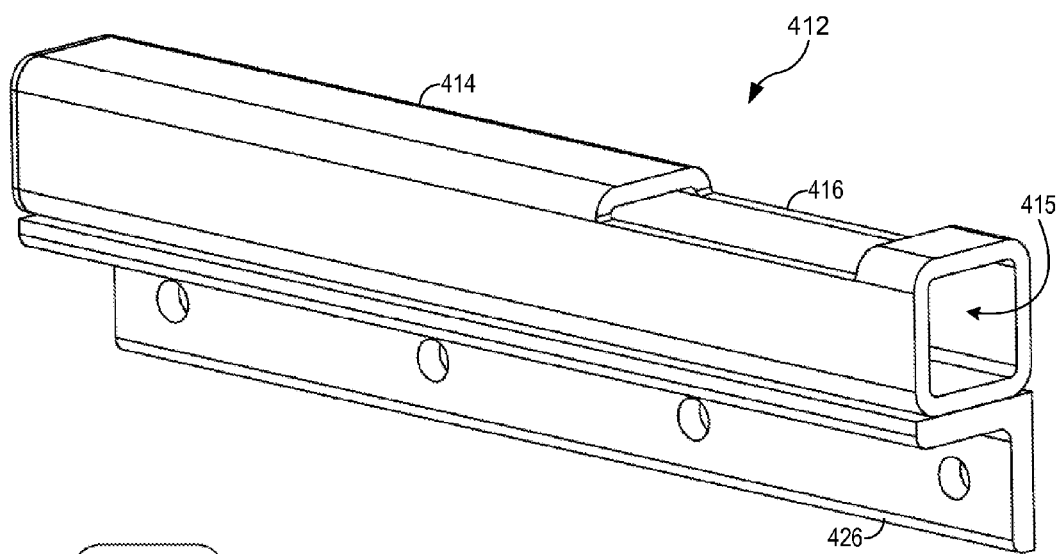
FIGS. 14A and 14B are perspective and side views of a gear guide, respectively.
Figure 14B:
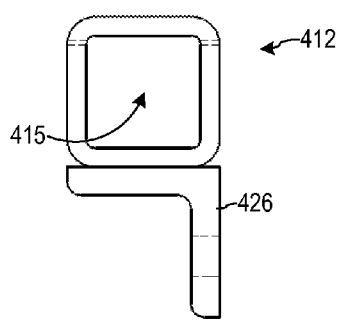

A piston portion of the first motor 601 may couple at one end to the second gear member 605. The second gear member 605 may be configured to slide within a gear guide 412. As shown in FIGS. 14A and 14B, the gear guide 412 may comprise a hollow tube member 414 that in some embodiments has generally a square profile. The square profile may be dimensioned to provide a gear guide receptacle 415 within walls of the gear guide 412 that may function as a track or guide for the second gear member 605, shown as a rack gear in FIG. 13. The walls of the receptacle 415 may maintain the direction of travel of the rack gear 605 generally along first direction x, shown in FIG. 13. The tube member 414 may comprise a length to accommodate the length of at least a portion of the rack gear 605 within the gear guide receptacle 415.

Turning back to FIG. 3C, the gear guide 412 may further comprise a gear guide opening 416 in the walls of the tube member 414 that allow the second gear member 605 to engage the first gear member for transferring the movement of the second gear member 605 into movement of the first gear member. In the embodiment shown, the second gear member 605 has gear teeth which are exposed in the gear guide opening 416. The gear teeth of the rack gear portion of the second gear member 605 may extend to mesh with gear teeth of the first gear member 604.

As shown in FIG. 13, the gear guide 412 may be mounted to the second support member 404. A mounting plate 418 may be coupled to an end of the second support member 404 opposite from the end where the second support member 404 couples to the first support member 402.

Figure 3C:
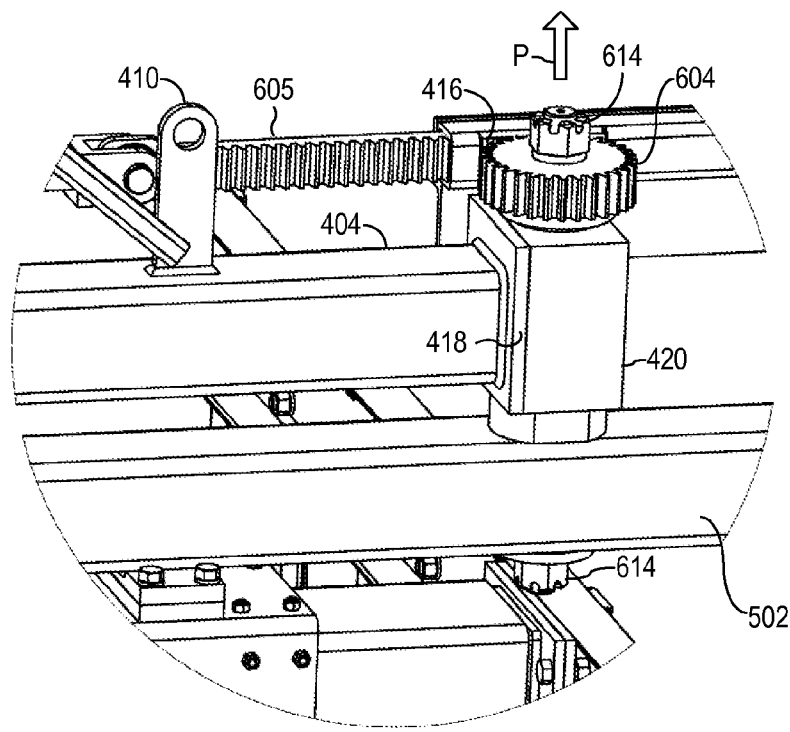
FIG. 3C is a close-up view of a portion "3C" of the hay lift assembly shown in FIG. 3B.

As shown in FIGS. 3C and 13, a block member 420 for supporting the pivot shaft 602 may be coupled on a side to a surface of the mounting plate 418. A block member bore 428 may extend through the block member 420 to provide a channel for allowing the pivot shaft 602 to pass through, as shown in FIG. 8A. The pivot shaft 602 may freely rotate within the block member bore 428.

Turning to FIG. 8A, first bearing member 607 and a second bearing member 613 extending at least partially within the pivot shaft 602 may provide a further bearing surfaces to support rotation of the pivot shaft 602 within the block member bore 428. In some embodiments, the first bearing member 607 comprises a bushing set into a recess in one end of an opening of the block member bore 428 and the second bearing member 613 comprises a bushing set into a recess in a second opposite end of the opening of the block member bore 428. The bushing may be made from bronze or other suitable material commonly known in the art. It should be understood that other bearing members may be used in place of the bushing shown, including ball bearings.

Figure 15A:
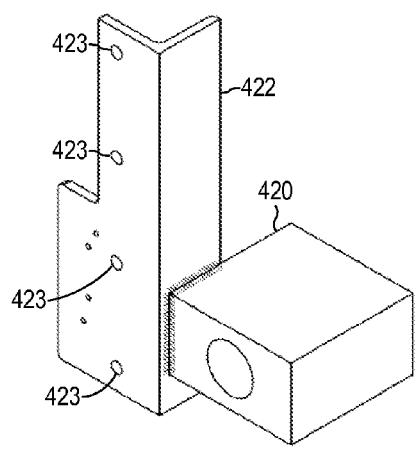
FIGS. 15A and 15B are a perspective and top view of a block coupled with a support bracket, respectively.
Figure 15B:
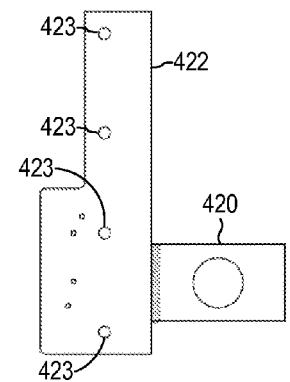

Turning now to FIGS. 15A and 15B, a first guide bracket 422 may be coupled to the block member 420. The first guide bracket 422 may comprise an elongated beam member having generally an L-shaped profile formed by two arms. A surface of a first arm may be coupled to a second side surface of the block member 420. As shown in FIG. 13, when coupled to the first guide bracket 422, the first guide bracket 422 extends in the second direction x generally parallel to the second support member 404. A second arm of the first guide bracket 422 may comprise a surface having apertures 423 extending through the second arm for receiving fastener members, such as gear guide bolts 424 shown in FIG. 13.

Referring to FIGS. 14A and 14B, a second guide bracket 426 may be coupled to the gear guide 412. The second guide bracket 426 may comprise an elongated beam member having generally an L-shaped profile formed by two arms. A surface of a first arm of the second guide bracket 426 may be coupled to a side surface of the gear guide 412 that is generally opposite from the side surface having the gear guide opening 416. A surface of the second arm of the second guide bracket 426 may comprise apertures configured to match up with apertures on the second arm of the first guide bracket 422. As shown in FIG. 13, the gear guide bolts 424 may fasten the first guide bracket 422 and the second guide bracket 426 by extending through the apertures in each second arm, respectively, and engaging gear guide nuts (not shown). In the assembled configuration shown in FIG. 13, the gear guide 412 couples with the second support member 404 to extend generally in a parallel direction, along second direction x. The receptacle of the gear guide 412 receives the second gear member 605 for slideable movement of the second gear member 605 within the gear guide receptacle 415, shown in FIGS. 14A and 14B.

In some embodiments, as shown herein, the mounting plate 418 may be welded to the second support member 404; the block member 420 may be welded to the mounting plate 418; the first guide bracket 422 may be welded to the block member 420; and the second guide bracket 426 may be welded to the gear guide 412. It should be understood by persons of ordinary skill in the art that other suitable fastening methods known and apparent may be used to make these couplings, including, and without limitation, chemical bonding, rivets, snap fits, nuts and bolts, and hooks and latches. Further, these components may be formed from separate parts as described or may be integrated into combinations of components, according to known and apparent methods of manufacture.

VI. Adapter Assembly 300

As shown in FIG. 1, the adapter assembly 300 may provide a mount for the hay lift assembly 1000 to couple to one or more types or commercial brands, such as the tractor 5, or other mobile vehicle suitable for operation of the hay lift assembly 1000. Each brand of tractor may come pre-configured with a bucket attached (not shown), which is generally removeable by the consumer. Removal of the bucket may provide features, depending on the brand, that allow the adapter assembly 300 to couple to the tractor. It should be understood that the adapter assembly may be configured with one or more of the features described below and other features, which are apparent to persons of ordinary skill, that allow the hay lift assembly 1000 to couple to one or more types or brands of tractor.

Figure 16A:
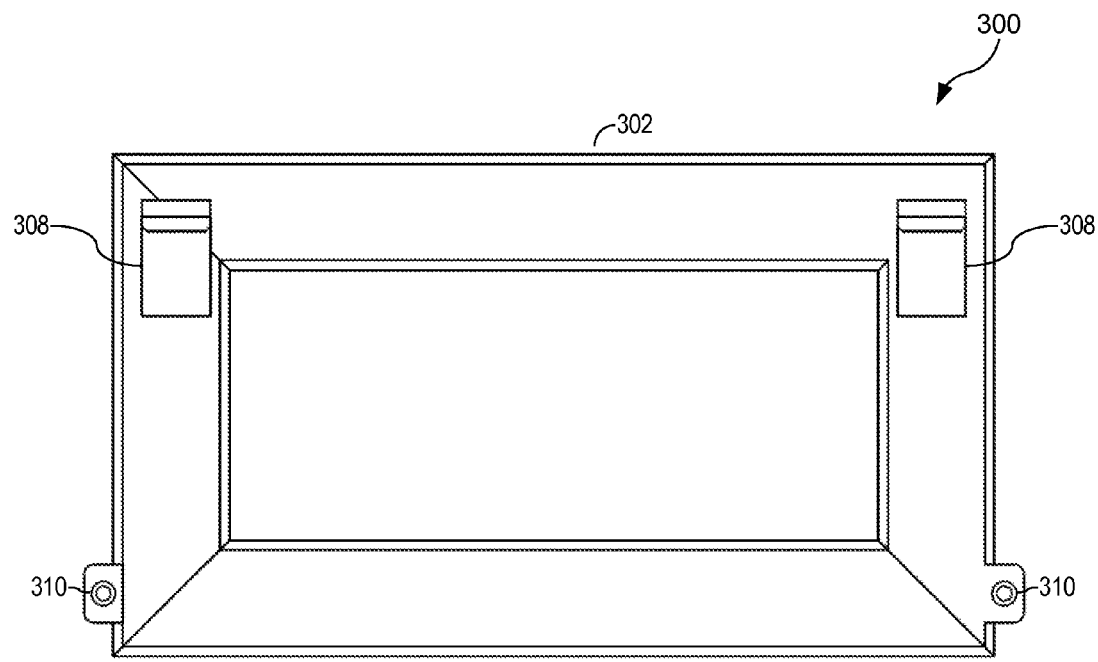
FIGS. 16A and 16B are a side and front view of an adapter assembly, respectively.
Figure 16B:
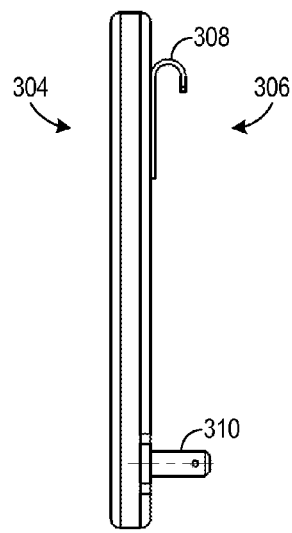

As shown in FIGS. 16A and 16B, the adapter assembly 300 comprises a frame 302. In some embodiments, the frame 302 is generally a four-sided beam member extending in a plane having a first side C and second side D. On a first side 304, the frame 302 may be configured to fasten to the first support member 402, as shown in FIG. 1.

On a second side 306 of the frame 302, the frame 302 may provide first attachment features 308 on first and second upper corners of the frame 302 and second attachment features 310 on third and fourth lower corners of the frame 302. The first attachment features 308 may comprise hook members for attachment to an arm of the front loader tractor 5. The second attachment features 310 may comprise pins extending from the frame 302 and configured for securing the frame 302 to the front loader tractor 5 by pins (not shown).

In some embodiments, the frame 302 may be attached to the first support member 402 by welding. It will be understood by persons of ordinary skill that other fastening structure and methods may be used including chemical bonding, fasteners like nuts and bolts, rivets, hooks, latches, locks, and other methods known in the art.

VII. Use and Operation of Hay Lift Assembly

The hay lift assembly 1000 may be used to grip, lift, move, rotate, and otherwise manipulate one or more bales of hay. The hay lift assembly 100 may be attached for use to the front loader 5 by hooking the first attachment members 308 of the frame 302 to receiving portions of an end of a front loader arm 6. The second attachment members 310, shown as pins, may receive keeper pins or bolts in apertures to secure the hay lift assembly 100 to the tractor 5. The tractor 5 may be used to move the hay lift assembly 1000 into position generally near to the bales of hay and generally into a position where the one or more bales of hay are between the first gripping member and the second gripping member. It should be understood by persons of ordinary skill that tractors having power capabilities of at least about 40-50 horsepower may be used, including tractors manufactured by various well-known companies, e.g. Kubota Tractor Corporation or John Deere.

The hay lift assembly 1000 may comprise one or more connection ports where the first motor 601 and the second motor 703 connect to the hydraulic and electric power source on the tractor 5. As shown in FIG. 3A, first connection ports 430 may be mounted to connection port bracket 432 (also shown in FIG. 12A) on a side surface of the first support member 402 to connect the first motor 601 to a hydraulic and electric source for power, such as tractor 5.

As shown in FIG. 3B, a retractable stand 721 may be coupled to a side surface of the housing member 702. The stand 721 may comprise a stand tube 724 pivotally coupled on a pivot member 722. The stand tube 724 may deploy away from the housing member 702 by having the end opposite from the pivot member 722 rotate away from the housing member 702.

The stand 721 may allow the hay lift assembly 1000 to be stored when not mounted on the tractor 5. The stand tube 724 may be pulled out to provide a support for keeping portions of the hay lift assembly 1000 off the ground and preventing dirt from collecting on the assembly 1000. A length $l_1$ of the stand tube 724 may be configured so that, when the stand tube 724 is deployed away from the housing member 702, the stand tube 724 extends to touch an underlying surface at about the same distance that the finger members 106 extend to touch an underlying surface to keep the hay lift assembly 1000 in substantially a horizontal configuration relative to an underlying ground surface. The stand 721 may further keep portions of the hay lift assembly 1000 at a raised position relative to an underlying ground surface for facilitating mounting the hay lift assembly 1000 to the tractor 5.

Figure 17A:
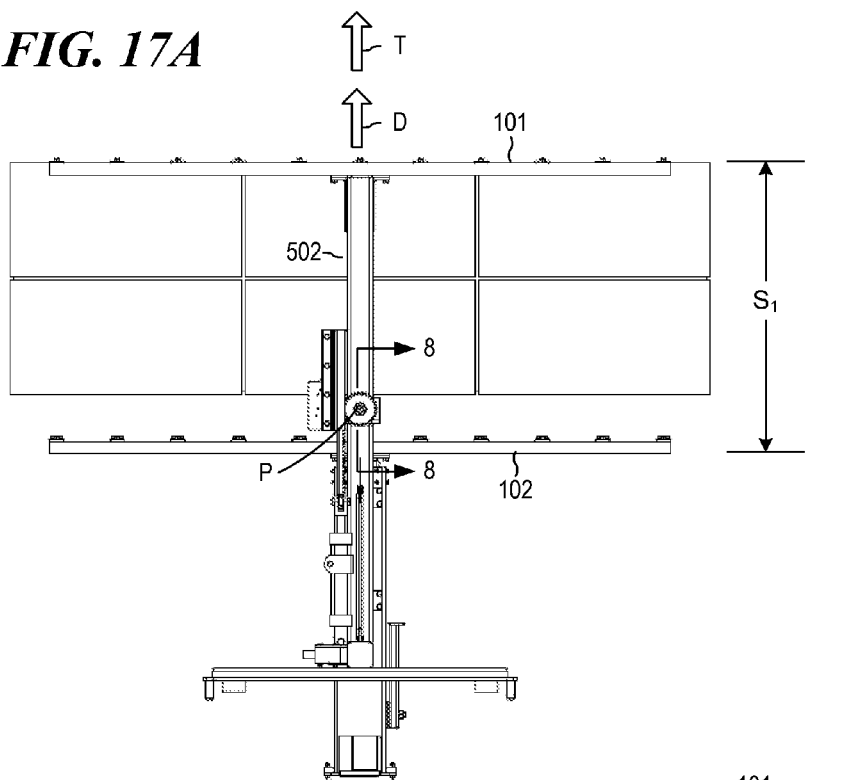
FIGS. 17A and 17B are top views of a hay lift assembly in first and second positions.
Figure 17B:
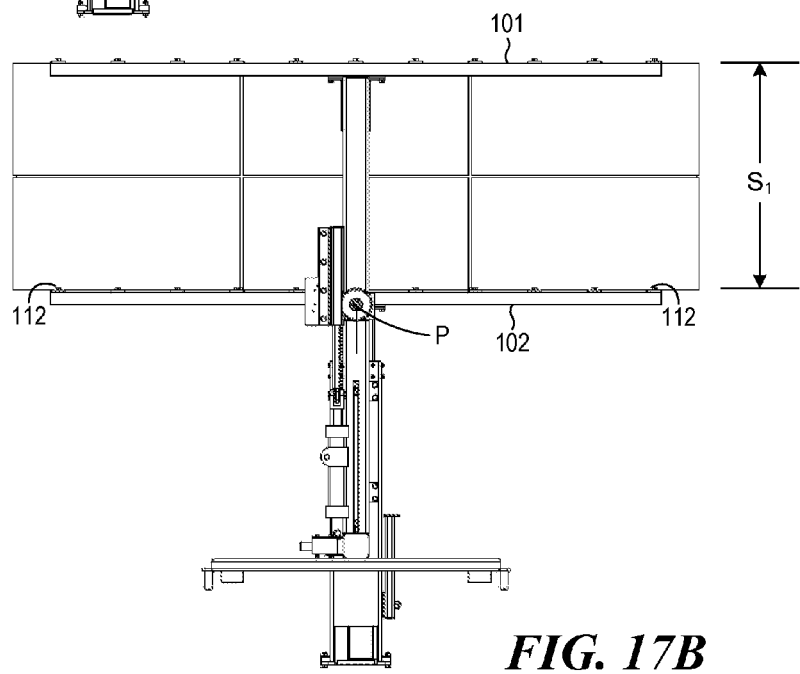

The tractor 5 using its internal power may move the arm 5 to place the first gripping member 101 and the second gripping member 102 to Position #1 shown in FIG. 17A so that the target bale of hay is positioned between the respective gripping surfaces of the first gripping member 101 and the second gripping member 102. The tractor 5 is removed from the views in FIGS. 17A and 17B for clarity, but it should be understood that the hay lift assembly 1000 is coupled to the tractor 5, in the manner shown in FIGS. 1 and 2, to provide support and power to the gripping members 101, 102 and rotations to the swing arm 502. Movement of the first gripping member 101 and the second gripping member 102 may be accomplished by lateral movement of the tractor 5 or by vertical movement of the arm 6. In some embodiments, the arm 6 positions the gripping assembly 100 above the target bale of hay and then lowers the first gripping member 101 and the second gripping member 102 into position.

In this first position #1, the swing arm 502 may extend in the first direction d substantially parallel to a direction of forward travel t of the tractor 5. The first gripping member 101 and the second gripping member 102 may each extend substantially perpendicular to the direction of forward travel t of the tractor 5.

Using the swivel action of the swivel assembly 600, the swing arm 502 may be actuated through use of the first motor 601 to rotate the first gripping member 101 and the second gripping member 102 about the pivot axis p into position to make contact with the target bale. As shown in FIG. 17A, to provide for optimal gripping of the target bale, the gripping surface of each of the first gripping member 101 and the second gripping member 102 may be rotated so that the plane of each gripping surface is substantially parallel to a substantially planar first side and opposing planar second side of the target bale. The arm 6 of the tractor 5 may also be used to lower the first gripping member 101 and the second gripping member 102 so that the ends of each bar member 104 are proximal to a bottom side of the target bale of hay, and near but not contacting the ground surface underlying the target bale.

At least one gripping member 101, 102 may be actuated to make contact with the target bale of hay. As shown FIG. 17B, the second gripping member 102 may be moved from the first position #1 of FIG. 17A to a second position #2 by the slider member 704 in a direction towards the first gripping member 101 and in a direction towards the target bale of hay. Power from the hydraulic system of the tractor may be further applied to compress the target bale between the gripping surfaces of the first gripping member 101 and the second gripping member 102 to ensure a firm hold on the target bale. The extension members 112 of the second gripping member 102 may at least partially puncture the target bale to improve the grip of the first gripping member 101 and the second gripping member 102.

The first gripping member 101 may provide a brace or a stop for facilitating gripping and lifting the target bale. The second gripping member 102 may move into the second position #2 to push the bale against the first gripping member 101. The first gripping member 101 being fixed to the swing arm 502 may be supported against movement away from the tractor 5 by a substantial portion of the weight of the tractor 5 so that the bale of hay is firmly gripped between the pressure provided movement of the second gripping member 102 and the reactive forces provided by the first gripping member 101.

The distance $s_1$ taken along the direction d between the first gripping surface of the first gripping member 101 and the second gripping surface of the second gripping member 102 may comprise a range of between forty-four (44) inches when the first gripping member 101 and the second gripping member 102 are positioned the furthest from each other and about ten (10) inches when the gripping members 101, 102 are at their closest together.

The maximum and minimum separation distance $s_1$ may be configured to fit and grip at least one or two bales of hay between the first gripping member 101 and the second gripping member 102. A bale of hay may have a width of 18 inches, and two bales would have a thickness of 36 inches. The maximum separation may comprise at least 36 inches to fit at least two bales of hay between the gripping members 101, 102 and the minimum separation would comprise about 18 inches to allow at least one bale of hay to be gripped between the gripping members 101,102. It should be understood that the design of the hay lift assembly 1000 may be modified to change the dimensions of the assembly 1000 to accommodate different conditions, such as increasing the maximum distance or decreasing the minimum distance between the gripping members 101, 102 to accommodate larger or smaller bales of hay.

The length of the swing arm 502 may be changed to move the relative positions of the first gripping member 101 and the second gripping member 102. In some embodiments, the swing arm 502 may comprise a length $l_s$, as shown in FIG. 2, taken from the first end 504 and the second end 506 of the swing arm 502. For example, the length $l_s$ may equal about sixty-eight inches (68").

In embodiments where the length $l_s$ is extended, the pivot axis P, including components of the swivel assembly 600 may be moved in a direction away from the adapter assembly and the tractor 5. This change moves the gripping members 101, 102 further from the tractor to give the hay lift assembly 1000 a longer reach, allowing hay bales to be stacked higher than assemblies with shorter swing arms. It should be further understood that moving the gripping members 101, 102 and swivel assembly 600 further from the tractor 5 may sacrifice handling of the bales of hay, because the bales are more susceptible to slippage from the gripping members due to bouncing movement of the tractor 5. It should be understood that extending the length of the swing arm $l_s$ from that shown in FIG. 2 will require modifications to dimensions of the support frame assembly, including but not limited to increasing the size of the first motor 601 and the length of the second support member 404.

As shown in FIG. 1, the target bale may be moved from a first height, location, and orientation to a second height, location, and orientation. The arm 6 may lift the hay lift assembly 100 to clear the underlying ground with the target bale still in the grip of the gripping assembly 100. The tractor 5 may move to a second location for placement of the bale of hay.

At the second location, the arm 6 may raise or lower the target bale to a desired height. In some cases, the target bale of hay may need to be stacked, which may required placing the target bale on top of a second bale of hay.

Figure 18A:
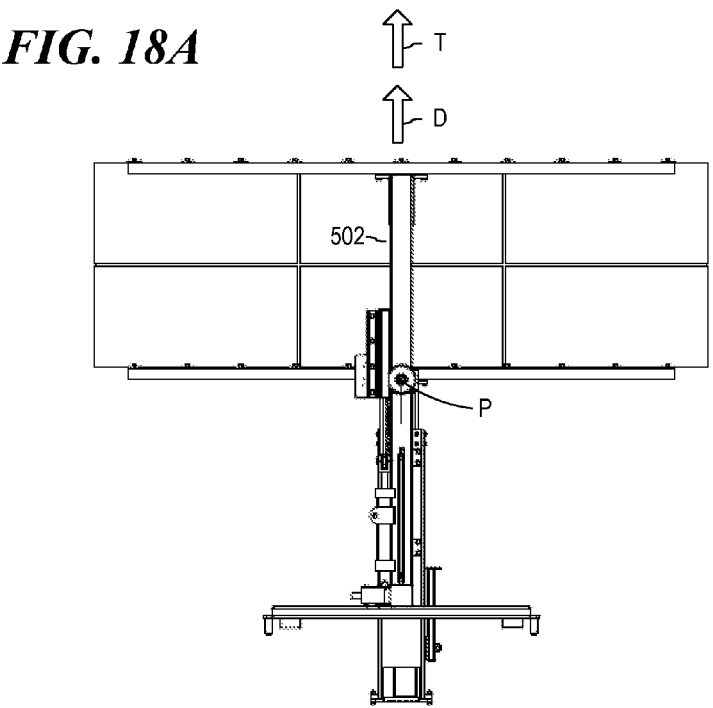
FIGS. 18A, 18B, and 18C are top views of a hay lift assembly in third, fourth, and fifth positions.
Figure 18B:
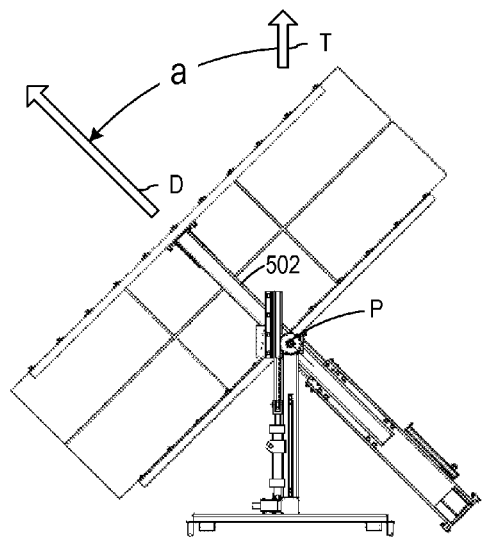
Figure 18C:
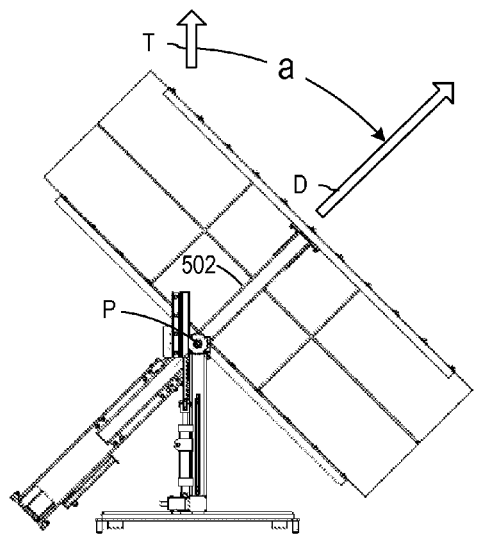
Figure 18D:
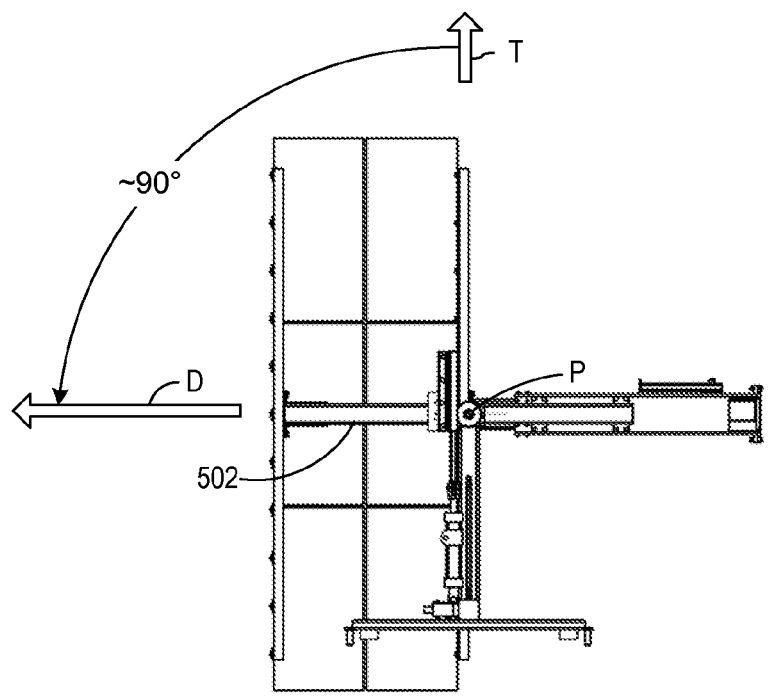
FIGS. 18D and 18E are top views of a hay lift assembly in sixth and seventh positions.
Figure 18E:
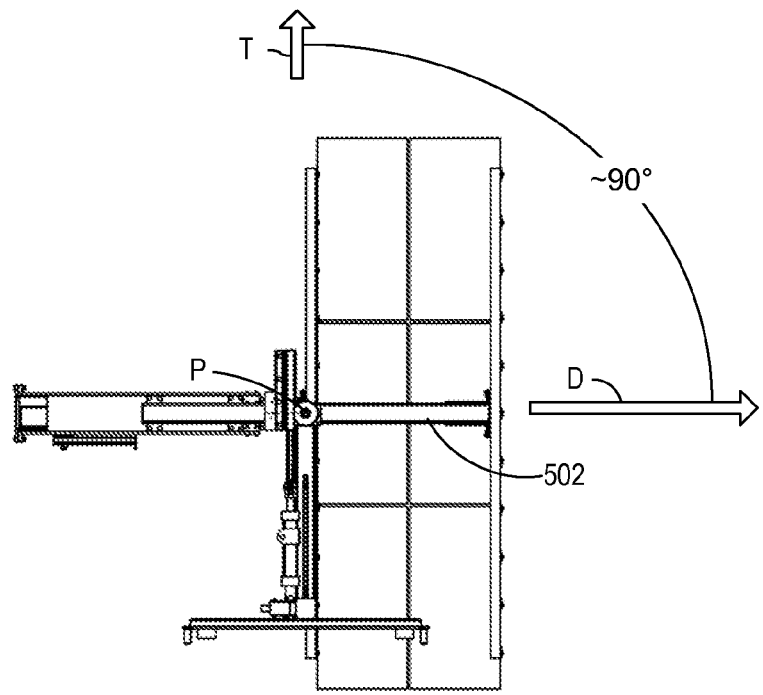

Referring now to FIGS. 18A, 18B, and 18C, the target bale of hay may need to be rotated to bring the target bale to a second orientation. To do so, the swing arm 502 may be rotated about the pivot axis P in either a counter clockwise (as shown in FIG. 18B) or clockwise (as shown in FIG. 18C) direction to put the target bale in the desired second orientation. As shown, the swing arm 502 may an angular range of movement "a" of about 180 degrees in order to turn the orientation of the target bale about 90 degrees in either direction from the direction of travel t of the tractor 5.

At the second location, the target bale of hay may be released by moving the slider member 704 to move the second gripping member 102 in a direction away from the first gripping member 101 and away from the target bale of hay. The second gripping member 102 may be retracted sufficiently so that the length of the extension members 112 clear the target bale to minimize any entanglement between the extension members 112 and the straw strands of hay.

VIII. Alternate Embodiment

Log Splitter Assembly 800

Figure 19A:
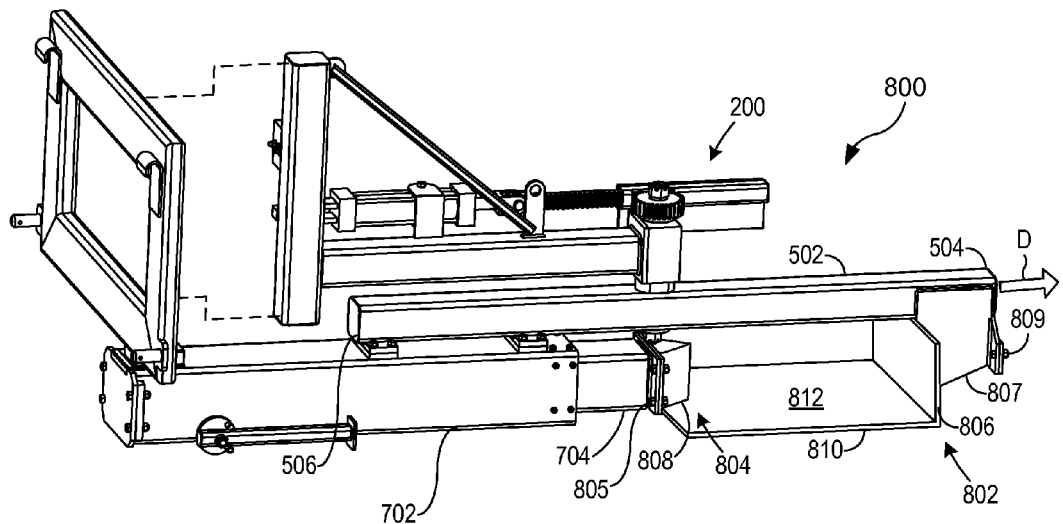
FIGS. 19A, 19B, and 19C are each perspective views of an alternative embodiment showing a log splitter assembly.
Figure 19B:
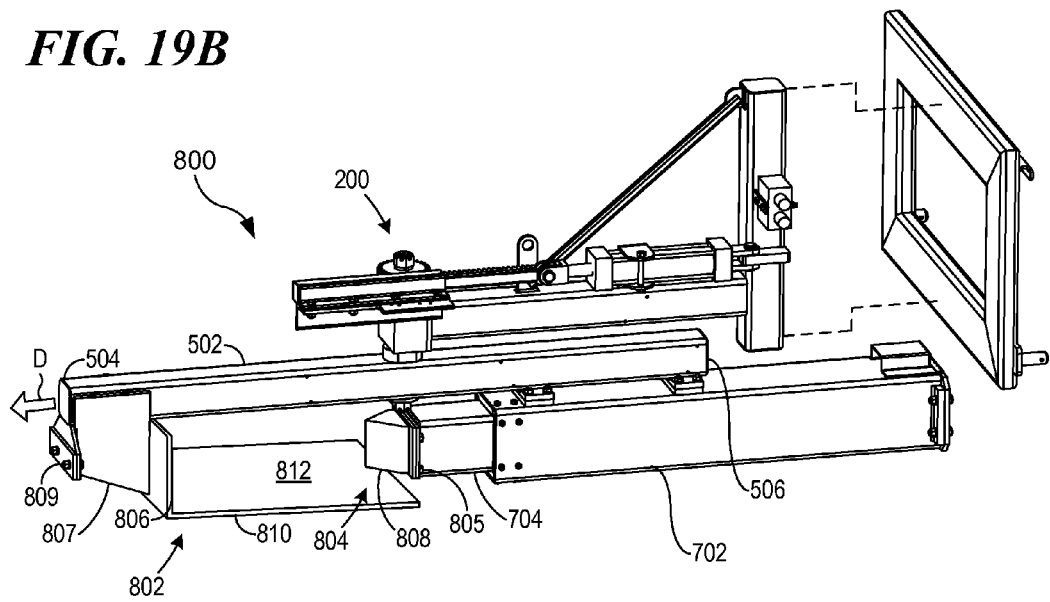
Figure 19C:
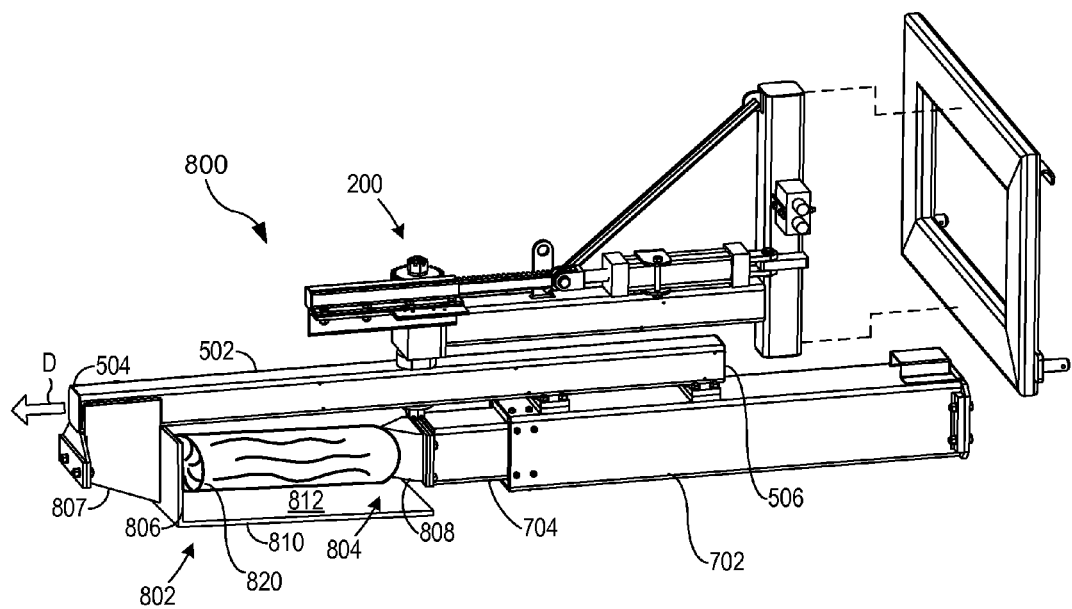

In the embodiment shown in FIGS. 19A, 19B and 19C, the actuation assembly 200 may be adapted for use in a log splitter assembly 800. A first log splitter member 802 may be coupled on the first end 504 and a second log splitter member 804 coupled on a second end 506 of the swing arm 502. The first log splitter member 802 may comprise an end plate 806 fixedly coupled to the first end 504 through an end plate bracket 807. The end plate 806 may be welded to the end plate bracket 807 and the end plate bracket 807 may be welded to the first end 504 and support by bolts. The end plate 806 may remain stationary relative to the swing arm 502 in the same way the first gripping member 101 may stay stationary relative to the swing arm 502 in the embodiments described above.

The second log splitter member 804 may comprise substantially a wedge member 808 for splitting logs. The second log splitter member 804 may be coupled by bolts to the slider member 704 in substantially the same way that the second gripping member 102 is coupled. Linear movement of the slider member 704 relative to the housing member 702 may move the wedge member 808 of the second log splitter member 804 in the direction d of the swing arm 502.

As shown in FIG. 19C, a wood log 820 may be positioned between the endplate 806 and the wedge member 808. In some embodiments, a log support platform 810 may be coupled between the endplate 806 and the wedge member 808. The log support platform 810 may be coupled to the endplate 806 and generally extend towards wedge member 808. It will be apparent to persons of ordinary skill that the log support platform 810 may be welded to the end plate 806, attached by other known fastening methods such as bolts, rivets, screws, or chemical bonding, or comprise one integrated component with the end plate 806.

The log support platform 810 may comprise a surface 812 for supporting the weight of the log and maintaining the position of the log 820 between the endplate 806 and the wedge member 808 during operation of the log splitter assembly 800. The wedge member 808 may be configured to slide over the log support platform 810, when the wedge member 808 is actuated. The support surface 812 may be configured to extend below the space where wedge member 808 will move at a height to allow for a log 820 to be advantageously positioned for splitting relative to the wedge member.

To split the wood log 820, the wedge member 808 may be moved by the slider member 704 in the direction d. As shown in FIGS. 9A and 9B, the slider member 704 may be coupled to a piston portion 710 of the second motor for linear movement of the slider member 704. The wedge member 808 may be moved by the hydraulic power supplied by the tractor 5 toward the wood log 820 to make contact and split the log 820 into two or more pieces.

The hay lift assembly 1000, as shown in certain embodiments in FIG. 1 and other figures, may be manufactured from metals, such as steel, aluminum, iron, alloys, fiberglass and other suitable materials known in the art. Methods of forming materials in the components herein described may be utilized according to the knowledge of a person of ordinary skill in the art. Those methods include casting or machining aluminum, steel, or other suitable material.

It should be recognized by persons of ordinary skill in the art that the components herein of the hay lift assembly 1000, as shown in certain embodiments in FIG. 1 and other figures, may be coupled, connected, mounted by various known fastening methods, some described herein and other known and apparent, including use of nuts and bolts, welding, chemical bonding, including adhesives, other mechanical fasteners, like latches, hooks, locks, snap fits, and other known fastening methods. Unless expressly limited, single components may be separated into two or more separate components and separate components may be manufactured as a single integral component, according to methods known and apparent to persons of ordinary skill in the art.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

I claim the following:

1. An apparatus for gripping bales of hay, comprising:
   a movable support configured for movement on an underlying support surface;
   a pivot arm having a length and coupled to the movable support for rotation about a pivot axis substantially stationary relative to the movable support in a substantially horizontal plane above the underlying support surface;
   an actuator coupled to rotate the pivot arm relative to the movable support;
   a first gripping member for contacting a first portion of one or more bales of hay, wherein the first gripping member is fixedly coupled to the pivot arm;
   a second gripping member moveably coupled to the pivot arm at a proximal end of the second gripping member for contacting a second portion of one or more bales of hay;
   wherein the first gripping member is configured to remain fixed relative to the pivot arm when the second gripping member is moved to grip one or more bales of hay;
   wherein the pivot arm is rotatable with respect to the movable support to reposition one or more bales of hay gripped by the first and second gripping members in a substantially horizontal plane above the underlying support surface; and
   wherein the proximal end of the second gripping member coupled to the pivot arm is configured to be translatable along at least a portion of the length of the pivot arm between a first position closer to the first gripping member than the pivot axis about which the pivot arm rotates and a second position at least as far from the first gripping member as the pivot arm pivot axis.

2. The apparatus of claim 1,
   wherein the first gripping member and the second gripping member comprise a first beam member and a second beam member, respectively, each of the first beam member and the second beam member extending substantially perpendicular to a first direction of the pivot arm, when the apparatus is in a first position; and
   wherein finger members are positioned along a length of each of the first beam member and the second beam member, and the finger members extend from each of the first beam member and the second beam member to form a first gripping surface on the first gripping member facing a second gripping surface of the second gripping member for making contact with one or more bales of hay.

3. The apparatus of claim 2,
   wherein each of the first gripping surface and the second gripping surface each extends in a plane substantially perpendicular to the first direction of the pivot arm, when the apparatus is in a first position.

4. The apparatus of claim 3, further comprising:
   a first motor for rotating the pivot arm to change an orientation of the first gripping surface and the second gripping surface relative to the movable support, wherein the movable support mounts the pivot arm to a tractor; and
   a second motor for moving the second gripping surface relative to the first gripping surface along the first direction of the pivot arm.

5. The apparatus of claim 4, wherein the first motor comprises a hydraulic motor configured to be operationally coupled to a hydraulic power source on a tractor.

6. The apparatus of claim 5, wherein the second motor comprises a hydraulic motor configured to be operationally coupled to a hydraulic power source on a tractor.

7. The apparatus of claim 6,
   wherein actuation by the first motor causes rotation of the pivot arm to change the orientation of the first gripping surface and the second gripping surface relative to the movable support.

8. The apparatus of claim 7,
   wherein the second motor is coupled to a slider member;
   wherein the second gripping surface is fixedly coupled to a piston member of the slider member; and
   wherein linear movement of the slider member caused by movement of the piston member causes linear movement of the second gripping surface relative to the first gripping surface along the first direction of the pivot arm.

9. The apparatus of claim 1, wherein the first gripping member is disposed at a position along the pivot arm such that the first gripping member is spaced apart from, and not intersected by, the pivot axis.

10. The apparatus of claim 1, wherein while in the first position,
    the second gripping member is disposed at a position along the length of the pivot arm such that the second gripping member is spaced apart from, and not intersected by, the pivot axis.

11. The apparatus of claim 1, wherein the first and second gripping members are secured to the pivot arm such that no portion of the first gripping member is in contact with the second gripping member as the second gripping member moves toward the first gripping member to grip one or more bales of hay.

12. The apparatus of claim 1, wherein the pivot arm is fixed against rotational movement in a vertical plane relative to the moveable support.

13. An apparatus for gripping bales of hay, comprising:
    a moveable support configured for movement on an underlying support surface;
    a support arm extending from the moveable support in a direction of forward travel of the moveable support, the support arm having a coupling for securing the support arm to the moveable support;
    a pivot arm having a length and coupled to the support arm for rotation in a substantially horizontal plane above the underlying support surface of the moveable support, and wherein the pivot arm comprises a first end distal to the moveable support and a second end proximal to the movable support;
    a pivot actuator coupled to the pivot arm to rotate the pivot arm relative to the support arm about a rotational axis;
    a first gripping member mounted on the first end of the pivot arm;

a second gripping member moveably mounted on the second end of the pivot arm at a proximal end of the second gripping member;

wherein the first gripping member is configured to remain fixed relative to the pivot arm when the second gripping member is moved to grip one or more bales of hay;

wherein the proximal end of the second gripping member mounted on the pivot arm is configured to be translatable along at least a portion of the length of the pivot arm between a first position closer to the first gripping member and a second position farther from the first gripping member;

a linear actuator having a length, the linear actuator secured to and pivoting with the pivot arm for translating the second gripping member along at least a portion of the length of the pivot arm;

wherein the pivot arm and linear actuator are rotatable with respect to the moveable support to reposition one or more bales of hay gripped by the first and second gripping members in a substantially horizontal plane above the underlying support surface; and wherein, in a first position, the pivot arm is configured to extend in a first direction substantially parallel to a direction of forward travel of the moveable support, and wherein, in the first position, the first gripping member and the second gripping member each extend substantially perpendicular to the direction of forward travel of the moveable support;

wherein at least a portion of the length of the linear actuator extends from the pivot arm rotational axis toward and beyond a portion of the support arm coupling farthest from a support arm rotational axis; and wherein the proximal end of the second gripping member mounted on the pivot arm is configured to be movable in translation along the pivot arm between a first position closer to the first gripping member than the pivot axis about which the pivot arm rotates and a second position at least as far from the first gripping member as the pivot arm pivot axis.

14. The apparatus of claim 13, wherein the first gripping member is configured to remain a fixed distance from the pivot axis about which the pivot arm rotates during gripping and rotation of one or more bales of hay.

15. The apparatus of claim 14,
wherein the second gripping member is movable along the first direction towards the first gripping member for pushing one or more bales of hay against the first gripping member to grip the one or more bales of hay.

16. The apparatus of claim 15,
wherein the pivot arm is mounted on a loader arm of a front loader tractor;
and wherein the tractor supports the first gripping member against movement, when one or more bales of hay are pushed against the first gripping member by movement of the second gripping member.

17. The apparatus of claim 15,
wherein the first gripping member is positioned distally from the mobile vehicle on the first end of the pivot arm relative to the second gripping member, and wherein the second gripping member is configured to move in a distal direction away from the mobile vehicle toward the first gripping member to grip one or more bales of hay.

18. The apparatus of claim 13, wherein the pivot axis about which the pivot arm rotates is substantially stationary relative to the moveable support.

19. An apparatus for gripping bales of hay, comprising:
a movable support configured for movement on an underlying support surface;
a pivot arm coupled to the movable support for rotation about a rotation axis substantially stationary relative to the movable support, between at least a first position and a second position, wherein each of the first and second positions is located in a substantially horizontal plane above the underlying support surface;
an actuator coupled to rotate the pivot arm relative to the movable support;
a first gripping member for contacting a first portion of one or more bales of hay, wherein the first gripping member is fixedly coupled to the pivot arm;
a second gripping member moveably coupled to the pivot arm for contacting a second portion of one or more bales of hay;
a second actuator for substantially linear movement of the second gripping member relative to the first gripping member in a direction substantially parallel to the longitudinal axis of the pivot arm, wherein the second actuator comprises a first end distal to the moveable support and a second end proximal to the moveable support, and wherein the distal first end of the second actuator is coupled to the second gripping member for movement of the second gripping member along at least a portion of the pivot arm;
wherein the first gripping member is configured to remain fixed relative to the pivot arm when the second gripping member is moved to grip one or more bales of hay;
wherein the pivot arm is rotatable to reposition one or more bales of hay gripped by the first and second gripping members from the first position to the second position; and
wherein linear movement of the second actuator is capable of causing the distal first end of the second actuator to pass through the rotation axis about which the pivot arm rotates.

20. The apparatus of claim 19, wherein the first gripping member comprises a planar first contact surface for contacting a first portion of one or more bales of hay, wherein the first contact surface extends along a portion of the length of the first gripping member extending upward from substantially the lowermost end of the first gripping member in a plane substantially perpendicular to the pivot arm.

21. The apparatus of claim 19, with the pivot arm having a length, wherein the second gripping member is moveably mounted on the second end of the pivot arm at a proximal end of the second gripping member, and wherein the proximal end of the second gripping member mounted on the pivot arm is configured to be translatable along at least a portion of the length of the pivot arm between a first position closer to the first gripping member and a second position farther from the first gripping member.

* * * * *